(12) United States Patent
Nagisetty et al.

(10) Patent No.: US 12,169,663 B1
(45) Date of Patent: Dec. 17, 2024

(54) MULTI-ZONE CONTENT OUTPUT CONTROLS

(71) Applicant: Amazon Technologies, Inc., Seattle, WA (US)

(72) Inventors: Monish Nagisetty, Lewis Center, OH (US); Aniket Vinay Phatak, Milpitas, CA (US)

(73) Assignee: Amazon Technologies, Inc., Seattle, WA (US)

( * ) Notice: Subject to any disclaimer, the term of this patent is extended or adjusted under 35 U.S.C. 154(b) by 51 days.

(21) Appl. No.: 18/082,754

(22) Filed: Dec. 16, 2022

(51) Int. Cl.
*G06F 3/16* (2006.01)
*G06F 3/14* (2006.01)
*G06F 16/64* (2019.01)

(52) U.S. Cl.
CPC ............ *G06F 3/165* (2013.01); *G06F 3/1423* (2013.01); *G06F 16/64* (2019.01)

(58) Field of Classification Search
None
See application file for complete search history.

(56) References Cited

U.S. PATENT DOCUMENTS

| | | | |
|---|---|---|---|
| 7,571,014 B1* | 8/2009 | Lambourne | G06F 3/165 700/94 |
| 9,142,071 B2* | 9/2015 | Ricci | H04L 63/0236 |
| 9,502,050 B2 | 11/2016 | Buck et al. | |
| 10,560,795 B1 | 2/2020 | Kim | |
| 2002/0124097 A1* | 9/2002 | Isely | H04L 12/2838 709/246 |
| 2005/0138662 A1* | 6/2005 | Seto | H04N 21/41422 386/E5.07 |
| 2006/0044214 A1* | 3/2006 | Hong | H04N 5/775 345/1.1 |

(Continued)

OTHER PUBLICATIONS

"Audio HAL," Android Open Source Project, Available Online at: https://source.android.com/devices/audio/implement, Accessed from Internet on Dec. 20, 2022, 8 pages.

(Continued)

*Primary Examiner* — Mandrita Brahmachari
(74) *Attorney, Agent, or Firm* — Kilpatrick Townsend & Stockton LLP

(57) ABSTRACT

Techniques for content output are described. A computing component determines that a first zone identifier is associated with at least a first permission that enables identifying first content output and controlling the first content output, and that a second zone identifier is associated with a second permission that enables identifying second content output and prohibiting the second content output. Based at least in part on the first permission, this component causes the first content output by a first speaker associated with the first zone identifier and causes a first display associated with the first zone identifier to present a first graphical user interface that identifies the first content and includes a content control component. Based at least in part on the second permission, this component causes the second content output by a second speaker associated with the second zone identifier and causes a second display associated with the second zone identifier to present a second graphical user interface that identifies the second content.

20 Claims, 18 Drawing Sheets

(56) References Cited

U.S. PATENT DOCUMENTS

| | | | |
|---|---|---|---|
| 2006/0155429 A1* | 7/2006 | Boone | B60K 35/00 701/1 |
| 2009/0146912 A1* | 6/2009 | Hiramatsu | G01C 21/3688 345/2.2 |
| 2009/0195712 A1* | 8/2009 | Strohmaier | H04N 21/41422 345/173 |
| 2010/0333146 A1* | 12/2010 | Pickney | H04N 21/41422 381/86 |
| 2011/0169755 A1* | 7/2011 | Murphy | G06F 9/451 345/173 |
| 2011/0289224 A1* | 11/2011 | Trott | H04L 65/4038 709/227 |
| 2012/0026409 A1* | 2/2012 | Higuchi | H04N 21/43615 348/734 |
| 2012/0197637 A1 | 8/2012 | Gratke et al. | |
| 2014/0074480 A1* | 3/2014 | Gratke | B60R 16/0373 704/E11.001 |
| 2014/0309875 A1* | 10/2014 | Ricci | G06Q 10/20 701/36 |
| 2017/0213541 A1 | 7/2017 | Macneille et al. | |
| 2017/0323639 A1 | 11/2017 | Tzirkel-hancock et al. | |
| 2017/0329329 A1 | 11/2017 | Kamhi et al. | |
| 2018/0024725 A1* | 1/2018 | Penilla | G07C 5/085 701/49 |
| 2018/0190282 A1* | 7/2018 | Mohammad | G10K 11/178 |
| 2019/0069251 A1 | 2/2019 | Wang et al. | |
| 2020/0219493 A1 | 7/2020 | Li et al. | |
| 2021/0092522 A1 | 3/2021 | Draper et al. | |
| 2021/0291619 A1* | 9/2021 | Aghniaey | B60H 1/00971 |
| 2022/0068253 A1 | 3/2022 | Pignier | |
| 2022/0194389 A1 | 6/2022 | Kim et al. | |
| 2023/0088236 A1 | 3/2023 | Medin et al. | |
| 2023/0325146 A1 | 10/2023 | Mistry et al. | |

OTHER PUBLICATIONS

"Automotive Audio," Android Open Source Project, Available Online at: https://source.android.com/docs/devices/automotive/audio#multi-zone, Accessed from Internet on Dec. 19, 2022, 9 pages.

"BlackBerry, Google, and Qualcomm Join Forces to Drive Advancements in Next-Generation Automotive Cockpits," Corporate Communications, Available Online at: https://blogs.blackberry.com/en/2021/10/blackberry-google-and-qualcomm-join-forces-to-drive-advancements-in-next-generation-automotive-cockpits, Oct. 12, 2021, 2 pages.

"Communication," Alexa, Available Online at: https://developer.amazon.com/en-US/docs/alexa/alexa- auto/communication.html, 13 pages.

Cunningham, "Harman Creates Personal Audio Zones for your Car," CNET, Available Online at: https://www.cnet.com/roadshow/news/harman-creates-personal-audio-zones-for-ces-2015/, Jan. 5, 2015, 2 pages.

"New Acoustic Innovations from Harman Bring the Whole Family Together with Easy to Use, Integrated and Upgradable In-Vehicle Experiences," Harman, Available Online at: https://news.harman.com/releases/new-acoustic-innovations-from-harman-bring-the-whole-family-together-with-easy-to-use-integrated-and-upgradable-in-vehicle-experiences, Feb. 10, 2022, 4 pages.

"OpenSynergy Collaborates with Google and Qualcomm," Open Synergy, Available Online at: https://www.opensynergy.com/opensynergy-collaborates-with-google-and-qualcomm/, Jul. 7, 2020, 1 page.

"QNX Acoustics Management Platform", Blackberry, QNX, Available Online at: https://blackberry.qnx.com/en/software-solutions/automotive/qnx-acoustics-management-platform, 7 pages.

"QNX Neutrino Real-time Operating System," Blackberry Available Online at: https://blackberry.qnx.com/en/software-solutions/embedded-software/qnx-neutrino-rtos, 2022, 7 pages.

"QNX Platform for Digital Cockpits," Product Brief, Available Online at: https://blackberry.qnx.com/content/dam/qnx/products/bts-digital-cockpits-product-brief.pdf, 2019, 4 pages.

"Qualcomm Revolutionizes the Digital Cockpit With 4th Generation Snapdragon Automotive Cockpit Platforms," 4th Generation Automotive Cockpit Platforms Usher in New Era of Enhanced, Premium Driving Experiences for Next Generation Vehicles, Jan. 26, 2021, 8 pages.

"Virtual I/O Device (Virtio) Version 1.0," Oasis, Committee Specification 04, Available Online at: https://docs.oasis-open.org/virtio/virtio/v1.0/virtio-v1.0.html, Mar. 3, 2016, 95 pages.

Singh et al., U.S. Appl. No. 18/082,340, "Multiple Zone Communications and Controls," filed Dec. 15, 2022, 120 pages.

* cited by examiner

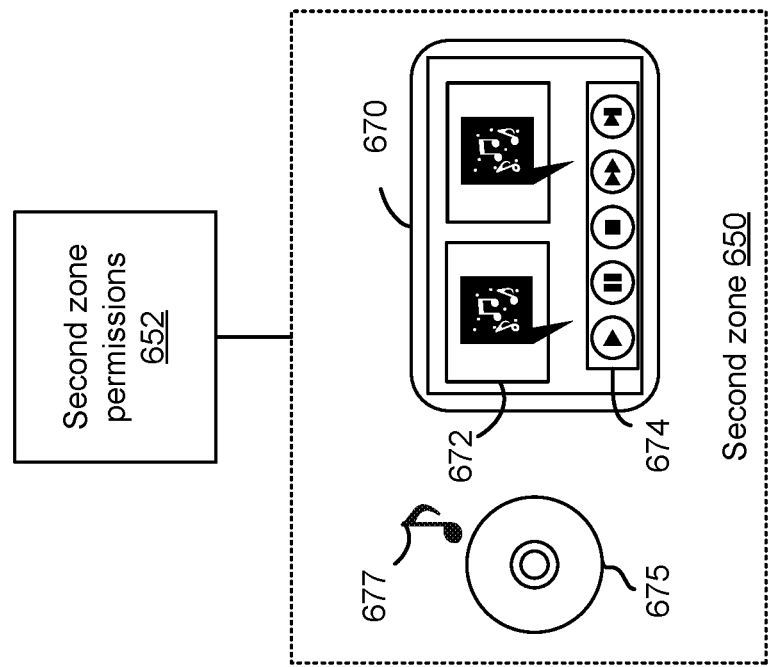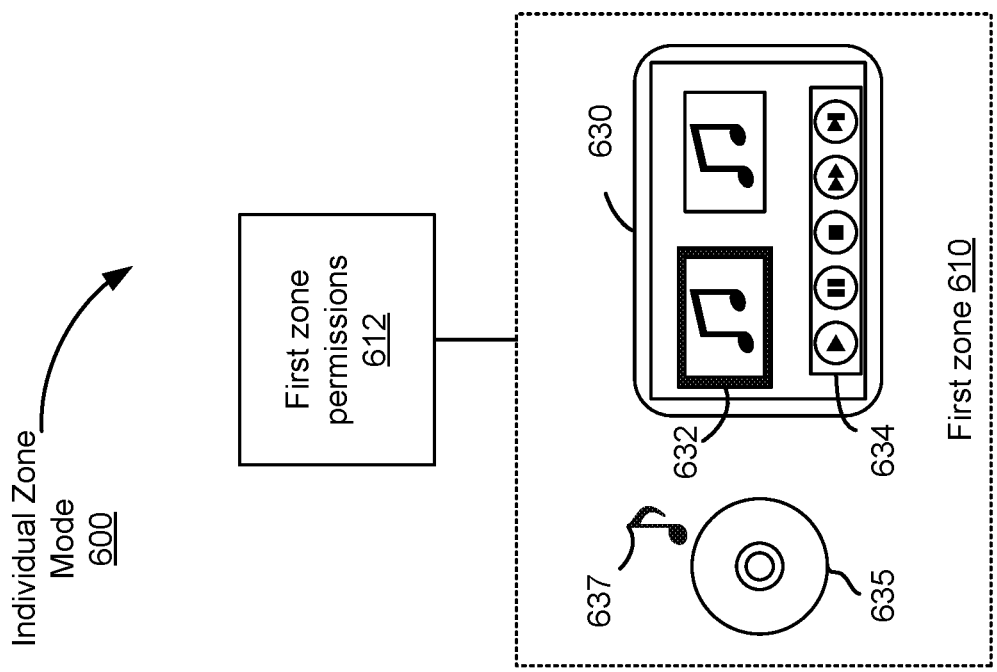
FIG. 6

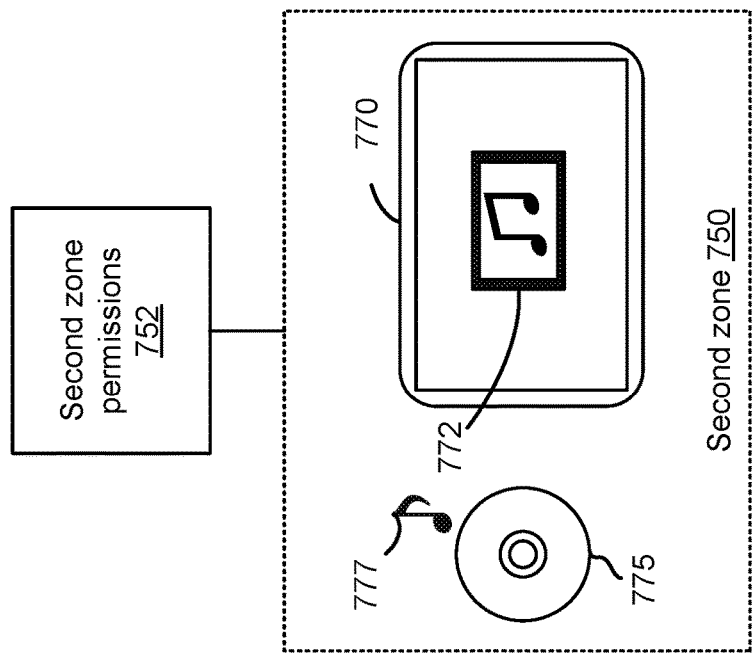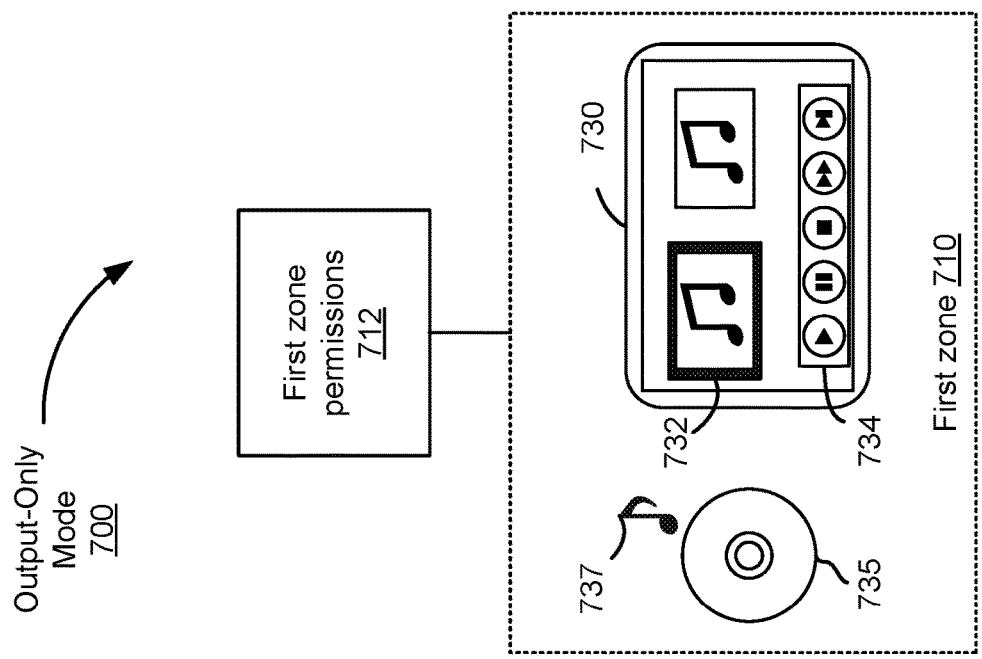
FIG. 7

MULTI-ZONE CONTENT OUTPUT CONTROLS

BACKGROUND

Content data can be sent from a source to multiple endpoints, such as speakers and/or displays. In certain implementations, the endpoints can be installed in a same and all wired to a central control interface. For example, in a car all the speakers can be controlled by a user interface within the driver's reach. The same audio can be played by all the car's speakers at the same time.

BRIEF DESCRIPTION OF THE DRAWINGS

Various embodiments in accordance with the present disclosure will be described with reference to the drawings, in which:

FIG. 6 illustrates an example of an individual zone mode, according to embodiments of the present disclosure;

FIG. 7 illustrates an example of an output-only mode, according to embodiments of the present disclosure;

DETAILED DESCRIPTION

Figure 1:
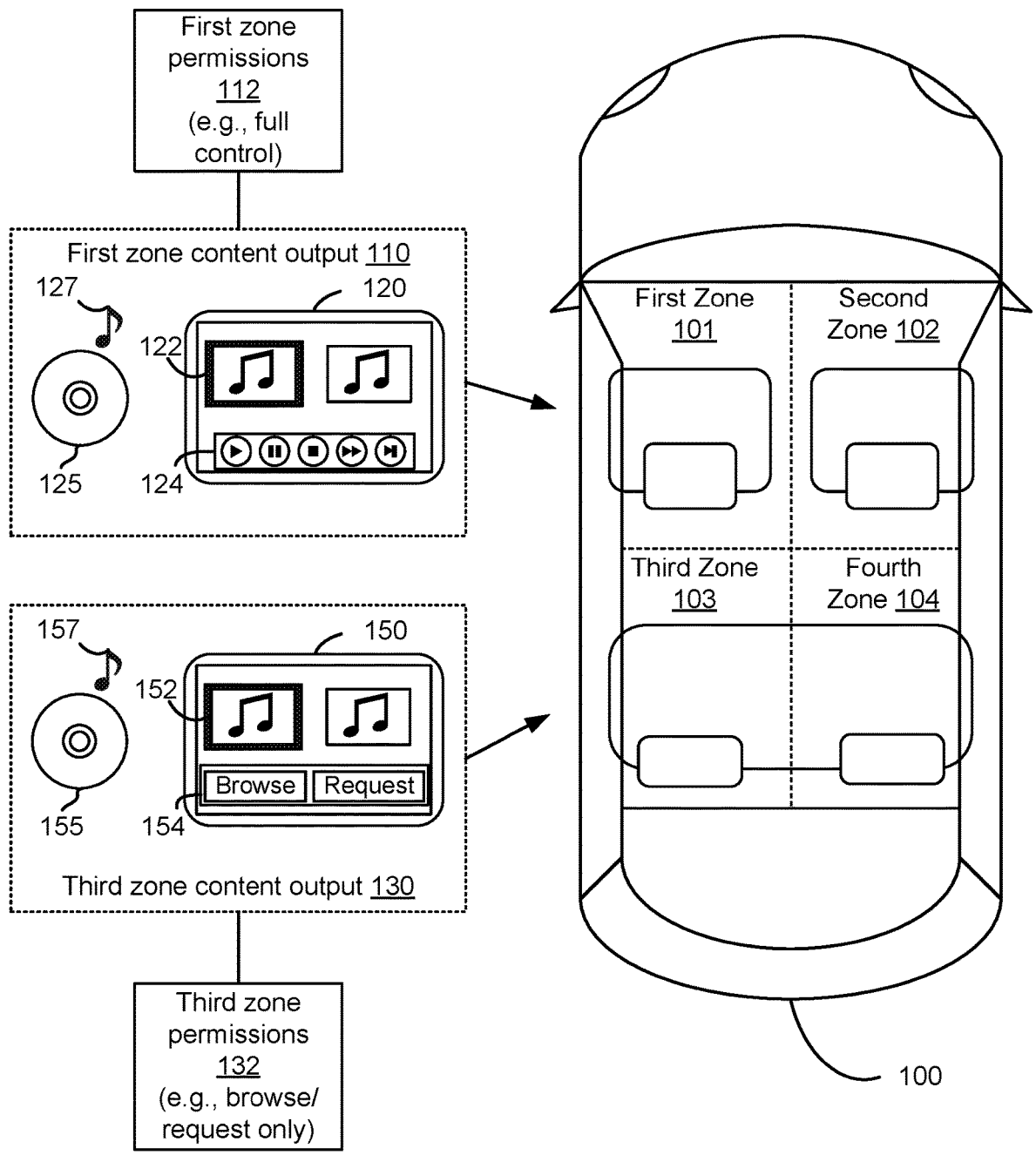
FIG. 1 illustrates an example of outputting content in multiple zones of a vehicle, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, outputting content in multiple zones and related controls. In an example, a vehicle (or, more generally a space) can include content-related components, such as speaker(s), display(s), and a computing component. The speakers and the displays can be associated with multiple zones of the vehicle's cabin (or the space). A zone can represent a grouping (logical or physical) of devices that are installed within the vehicle (the space), where the grouping can be referred to with a zone identifier and used as to output content. In the case of a logical group, the association of devices with the zone may dynamically change (e.g., the zone may initially be associated with a first display and a first speaker installed to subsequently be additionally associated with a second display and a second speaker). An example of a multiple zone configuration of a vehicle includes a driver zone, a front passenger zone, a rear right passenger zone, and a rear left passenger zone. A vehicle is used herein as an example of a space. Other types of spaces are available, such as a house, a school, an office, a hotel, a shopping establishment/mall, a theater, etc. In the example of a house, a multiple zone configuration includes a first room, a second room, etc. Each of such zones includes at least one speaker and one display. The computing component can receive content data from a content source that is external to the vehicle (the space) and can send the content data to the speakers and/or displays to be output. The content output can depend on an operational mode.

Different operational modes are possible and can include a multiple zone mode, an individual zone mode, and an output-only mode. In the multiple zone mode, the same content is output by devices associated with different zones. In the individual zone mode, a device associated with a zone can output its own content that can be different from that of a device associated with another zone. In the output-only mode, a device associated with a zone can output content but no controls over this output is available in association with the zone.

Furthermore, each of the zones can be associated with a set of permissions that can depend on the operational mode. Generally, a set of permissions associated with a zone indicates, among other things, available controls in association with the zone over the content output. For example, in the multiple zone mode, a permission-controlling zone (e.g., driver-controllable zone) can be associated with first permissions enabling content controls (e.g., play, skip, fast forward, etc.) over the content output by devices associated with that zone and with at least a second zone (e.g., a passenger zone). In comparison, the second zone can be associated with second permissions (e.g., to browse a content library and request particular content from this library). In the individual zone, the second zone can be associated with third permissions enabling the content controls (e.g., play, skip, fast forward, etc.) over the content output on devices associated with the second zone only. In the output-only mode, no control controls may be permitted for devices associated with the second zone.

Upon device (e.g., a speaker) associated with a zone outputting content, a display associated with the zone can present a graphical user interface (GUI) that that indicates the content output (e.g., by identifying the particular content) and includes GUI components. At least some of the GUI components can be configured depending on the applicable set of permissions associated with the zone. For example, if the set of permissions indicate that content controls are available (e.g., play, skip, fast forward, etc.), the GUI components include content control components (e.g., a play GUI component, a skip GUI component, a fast forward GUI component, etc.). In comparison, if the set of permissions indicate that no such content controls are available, no such content control components are included in the GUI. In this way, the GUI components can provide a visual pairing of the content output and the available controls.

To illustrate, consider an example of music playback. In this example, the driver zone and the rear right passenger zone are operated in the multiple zone mode. The computing component receives music data corresponding to a music playlist from an external music source and sends the music data to a first speaker associated with the driver zone and to a second speaker associated with the rear right passenger zone. The server also sends first data to a first display associated with the driver zone and to a second display associated with the rear right passenger zone, where this data identifies the music playlists and includes metadata for each music title in the music playlist. Further, the computing component determines that the driver zone is associated with first permissions to control the music output, whereas the rear right passenger zone is associated with second permissions to browse and request music titles. Accordingly, the computing component sends second data and a command to the first display, where this second data indicates the permitted controls over the music output, and where this command requests the first display to present GUI components that show the permitted music output controls. The computing component also sends third data and a command to the second display, where this third data indicates the browse and request controls, and where this command requests the second display to present GUI components that show such browse and request controls. In turn, the first speaker outputs music, while the first display presents a first GUI that identifies playlist and the music title being output and that includes a play GUI component, a skip GUI component, and a fast forward GUI component. In comparison, the second speaker also outputs the music, while the second display presents a first GUI that identifies playlist and the music title being output and that includes a browse GUI component and a request GUI component, but no play GUI component, skip GUI component, or fast forward GUI component.

In the interest of clarity of explanation, various embodiments of the present disclosure are described in connection with zones of a vehicle and three particular operational modes. However, the embodiments are not limited as such. Instead, the embodiments similarly and equivalently apply to any space that includes a computing component (or some other computer system component) and endpoints, where such endpoints are communicatively coupled with the computing component and can be physically and/or logically grouped in multiple zones. Such a space can be in an aircraft, ground craft, watercraft, or in a stationary structure (e.g., a house, a school, an office, a hotel, a shopping establishment/mall, a theater, etc.). Further, the operational modes need not be limited to the multi-zone mode, the individual zone mode, or the output-only mode. Instead, the embodiments similarly and equivalently apply to any operational mode associated with a set of permissions and/or any number of operational modes. For example, a space can be house that includes multiple rooms. A zone can correspond to a room. In this example, each zone can be associated with a set of permissions to output and/or control content. A first room can be associated with a first permission to select and control content output in the first room and a second room. The second room can be associated with a second permission to request content output in the second room and may not have permissions to control the content output in this room or the first room. In this example, zone identifiers can correspond to the rooms and can be associated with permission data and device identifiers. The permission data specify the first and second permissions, whereas the device identifiers indicate the devices where the content output and related controls can be presented.

FIG. 1 illustrates an example of outputting content in multiple zones of a vehicle 100, according to embodiments of the present disclosure. As illustrated, the vehicle 100 includes four zones: a first zone 101, a second zone 102, a third zone 103, and a fourth zone 104, although a different zone configuration is possible. Content, such as audio content or multimedia content (e.g., audio and video content), can be output in each zone by using at least one speaker (e.g., in the case of audio content) and/or at least one display (e.g., in the case of multimedia content where a display can present visual content such as video) in the zone. Further, each zone can be associated with a set of permissions that specify controls over the content output. When content is being output in the zone, at least one display in the zone can present a graphical user interface (GUI) that indicates the content and that includes GUI components that depend on the zone's set of permissions.

Generally, a zone can be a physical portion of a physical space, where the portion includes at least one endpoint, such as at least one speaker, at least one display, or a combination of at least one speaker and one display. A zone can also or alternatively be a logical group of devices located in a space, where the group corresponds to at least one speaker, at least one display, or a combination of at least one speaker and one display. In both situations (e.g., physical zone or logical zone), a zone can have a zone identifier that uniquely identifies the zone in the vehicle 100. The zone identifier can be associated in a data structure with a device identifier(s) of the device(s) of the zone. In an example, the data structure uses using key-value pairs, where the key includes the zone identifier, and the value includes a device identifier, such as speaker identifier of a speaker, a display identifier of a display, or any other device identifier of a device of the zone. The data structure stores configuration data that indicates the zone configuration of the vehicle 100 (e.g., the associations between zone identifiers and endpoint identifiers)

In the illustration of FIG. 1, the first zone 101 corresponds to a driver zone and includes a first display 120 and a first speaker 125. As such, the first zone 101 has a first zone identifier that is associated with a first display identifier of the first display 120 and a first speaker identifier of the first speaker 125. Similarly, the third zone 103 corresponds to a rear left passenger zone and includes a second display 150 and a second speaker 155. Here, the third zone 103 has a second zone identifier that is associated with a second display identifier of the second display 150 and a second speaker identifier of the second speaker 155. As used herein, a device located, installed, or included in a zone refers to a device that is associated with the zone. In the case when the zone is a physical space, the device can be physically present within the physical space. In the case of a logical group, the device's identifier can be associated, in a data structure, with the zone's identifier.

The zone configuration of the vehicle 100 can be static. In other words, the configuration data can be pre-defined, and no changes thereto may be possible. Alternatively, the zone configuration of the vehicle 100 can be dynamic. In other words, the configuration data can be updated over time to change the zone configuration. For example, the first zone 101 and the second zone 102 can be grouped together to become a front zone. The configuration data can be updated to reflect this grouping such, as by including a zone identifier of the front zone and associating this zone identifier with the first zone identifier of the first zone 101 and the second zone identifier of the second zone 102 and/or with the endpoint identifiers of the endpoints of the first zone 101 and the second zone 102. The update can be triggered from the vehicle 100 (e.g., by using the display 120, the speaker 125, and/or any other device of the driver zone and/or an infotainment system head unit). Additionally or alternatively, the update can be triggered by the original equipment manufacturer (OEM) or by an owner or operator of the vehicle 100 (e.g., in the case of a rental company or a ride share service company). The configuration data can be stored locally at the vehicle 100 (e.g., at a computing component installed in the vehicle 100) and/or remotely at a data store accessible to such computing component.

Different operational modes are possible including a multi-zone mode, an individual zone mode, and an output-only mode. In the interest of clarity of explanation, such modes are described herein in connection with the first zone 101 and the third zone 103 but can similarly and equivalently apply to the second zone 102, the fourth zone 104, and/or any combination of the four zones 101-104.

In the multi-zone mode, the first zone 101 and the third zone 103 output the same content, such that the same content experience is shared in these two zones 101 and 103. For example, in the case of audio output, the first speaker 125 receives and outputs first audio data, whereas the second speaker 155 receives and outputs second audio data that corresponds to the first audio data (e.g., that is another copy of the first audio data). The first audio data and the second audio data are output simultaneously in a time synchronized manner (e.g., a time difference between the outputs may exist but may not be noticeable to human users). In the case of video data, the first display 120 receives and outputs first video data, whereas the second display 150 receives and outputs second video data that corresponds to the first video data (e.g., that is another copy of the first video data). The first video data and the second video data are output simultaneously in a time synchronized manner (e.g., a time difference between the outputs may exist but may not be noticeable to human users).

In the individual zone mode, the first zone 101 and the third zone 103 output different content, such that a different individualized content experience is provided in each of the two zones 101 and 103. For example, in the case of audio output, the first speaker 125 receives and outputs first audio data, whereas the second speaker 155 receives and outputs second audio data that does not correspond to the first audio data (e.g., that is not another copy of the first audio data). The first audio data and the second audio data need not be output in a time synchronized manner. In the case of video data, the first display 120 receives and outputs first video data, whereas the second display 150 receives and outputs second video data that does not correspond to the first video data (e.g., that is not another copy of the first video data). The first video data and the second video data need not be output in a time synchronized manner.

In the output-only mode, the first zone 101 and the third zone 103 can output different content, but the experience may not be individualized. As further described herein below, limited controls, if any, over the content output may be available in the output-only mode. For example, in the case of audio output, the first speaker 125 receives and outputs first audio data, whereas the second speaker 155 receives and outputs second audio data that may or may not correspond to the first audio data and that may or may not be output in a time synchronized manner with first audio data. Here, no controls may be available to the third zone 103 to change the second audio output. In the case of video data, the first display 120 receives and outputs first video data, whereas the second display 150 receives and outputs second video data that may or may not correspond to the first video data and that may or may not be output in a time synchronized manner with first video data. Here, no controls may be available to the third zone 103 to change the second video output.

Operational data can be stored (e.g., in the same data store or a different data store storing the configuration data) and indicate the operational mode(s) in use and the associated zone(s). The data store can be in the vehicle 100 or external to the vehicle 100. The operational data can include a mode identifier that uniquely identifies one of the three modes and a zone identifier(s) of the zone(s) to which the operational mode applies.

The operational data can change over time. For example, a change from one operational mode to another operational mode can be triggered from one or more zones 101-104 (e.g., from the driver zone 101 by using the display 120, the speaker 125, and/or any other device of the driver zone 101) and/or via the infotainment system head unit. The operational data in the data store to indicate the change.

Each zone can be associated with a set of permissions related to content output. Generally, the set of permissions associated with a zone enable identifying the content output in at least that zone. Depending on a number of factors, the set of permissions can further indicate the types of controls available from the zone to control the content output in that zone and, possibly, in one or more of the other zones.

One example factor is the operational mode in use in the zone. For example, in the multi-zone mode, one zone (e.g., the driver zone 101) can be designated as a primary zone, whereas the remaining zone(s) (e.g., the third zone 103) can be designated as a secondary zone. Such designations can be stored in the operational data by default or based on user input at an endpoint within the vehicle 100 or at a device external to the vehicle 100 such as via a mobile application on a mobile device that is securely communicatively coupled with the vehicle 100. The primary zone can be associated with first permissions that provide full control over the content output (e.g., to browse content or content libraries, output particular content, output a particular content library, skip particular content, fast forward, pause, stop, rewind, etc.) in all the zones to which the multi-zone mode applies. The secondary zone can be unassociated with the first permissions and associated with second permissions that are more limited in nature than the first permissions by being a subset of the first permissions and by being applicable to the secondary zone only (e.g., to browse content and request particular content or a particular content library to be output, where such a request can be output in the primary zone). In the individual zone mode, a zone to which this mode applies can be associated with permissions that provide full control over the content in that zone only. In the output-only mode, a zone to which this mode applies can be associated with third permission that are even more limited in nature than the second permissions and that enable the outputting of content in that zone and disable other controls (e.g., to show a progress bar of the content output, to increase or increase the audio volume, to mute or unmute the audio output, but no browse, request, or playback controls).

Permission data can be stored (e.g., in the same data store or a different data store storing the operational data) and indicate the set of permissions and the associated zone(s). The data store can be in the vehicle 100 or external to the vehicle 100. The operational data can include a permission identifier that uniquely identifies a permission and/or a permission descriptor that describes the permission and a zone identifier(s) of the zone(s) to which the permission applies.

The permission data can change over time. For example, a change from one set of permissions to another set of permissions can be triggered from one or more zones 101-104 (e.g., from the driver zone 101 by using the display 120, the speaker 125, and/or any other device of the driver zone 101) and/or via the infotainment system head unit, and/or can be the same trigger as that of an operational mode change. The permission data in the data store to indicate the change.

In the illustration of FIG. 1, audio is output in the first zone 101 and the third zone 103, where the multi-zone mode applies to these two zones 101 and 103. The first zone 101 is designated as the primary zone and is associated with first zone permission 112 that provide full control. The third zone 103 is designated as a secondary zone and is associated with third zone permissions 132 that enable browsing of audio content and the requestion of particular audio content only.

Accordingly, a first zone content output 110 is provided in the first zone 101. This content output 110 involves the speaker 125 outputting first audio 127 and the display 120 outputting a first GUI that includes, among other things, an identifier 122 of the first audio 127 that is being output by the speaker 125, a first GUI control component 124 showing the full audio controls (e.g., this first GUI control component 124 can be a control bar that includes a play control, a pause control, a stop control, a fast forward control, a skip control, etc.).

A third zone content output 130 is also provided in the third zone 103. This content output 130 is time synchronized with the first zone content output 101 and involves the speaker 155 outputting second audio 157 corresponding to the first audio 127 and the display 150 outputting a second GUI that includes, among other things, an identifier 152 of the second audio 157 that is being output by the speaker 155, a second GUI control component 154 showing the limited audio controls (e.g., this first GUI control component 154 can include a browse component to browse the audio content from an audio library and a request component to request that particular audio content, where this request would be presented in the first zone 101).

Figure 2:
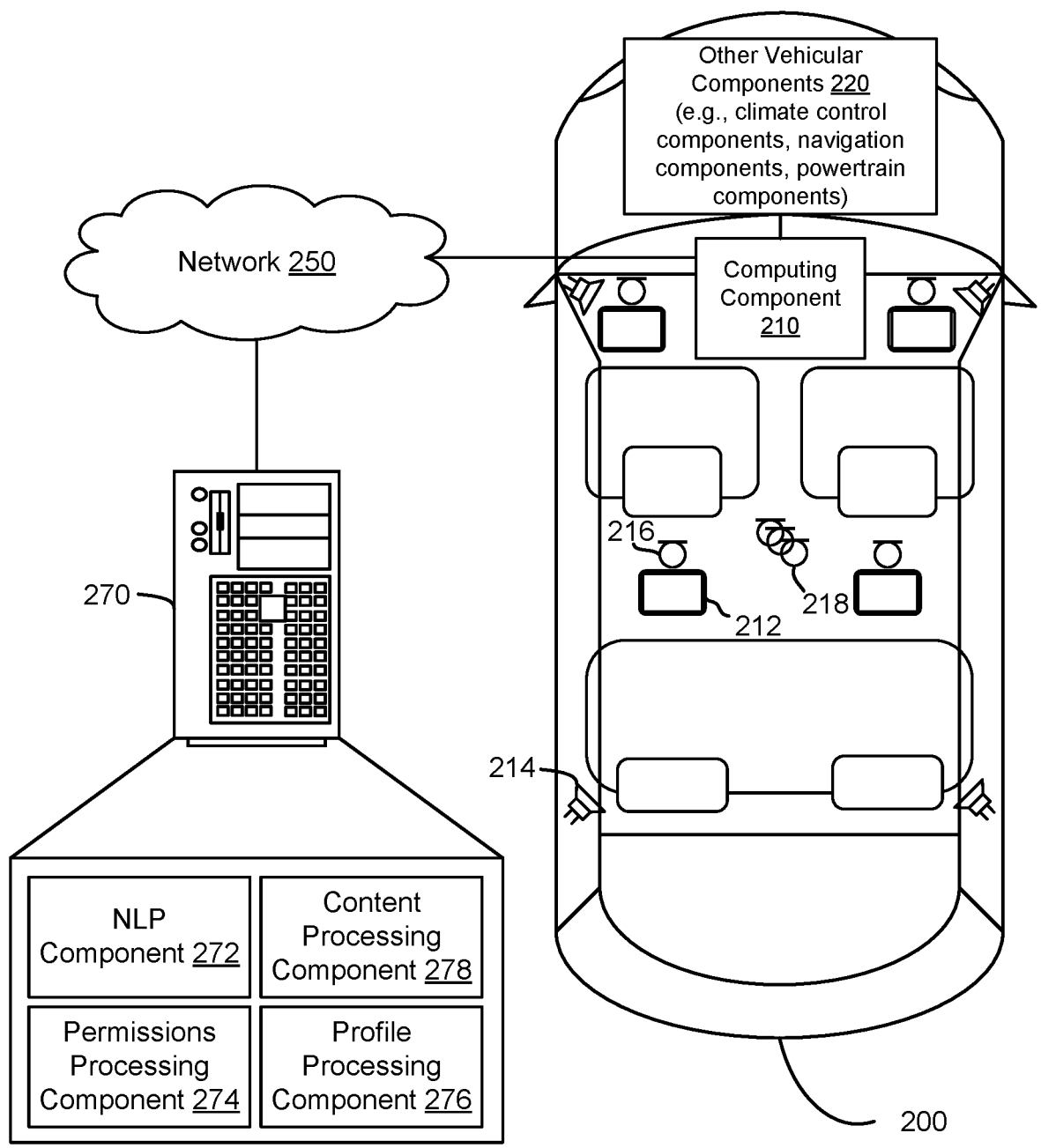
FIG. 2 illustrates an example of a multiple zone configuration of a vehicle, according to embodiments of the present disclosure.

FIG. 2 illustrates an example of a multiple zone configuration of a vehicle 200, according to embodiments of the present disclosure. The vehicle 200 is an example of the vehicle 100 of FIG. 1. The vehicle 200 can include a plurality of vehicular systems, such as an infotainment system, a powertrain system, a climate control system, a navigation system, etc. The infotainment system can support functionalities of the zone configurations and multiple operational modes described herein, although it may be possible that such functionalities can be supported by a standalone system that interfaces with the infotainment system and/or other vehicular systems. In the illustration of FIG. 2, the infotainment system includes a computing component 210, a plurality of displays 2112, a plurality of speakers 214, and a plurality of microphones 214 and 218 that are installed in the vehicle 200. The powertrain system can include components that are installed in the vehicle 200 and that control and cause movement of the vehicle 200. The climate control system can include components that are installed in the vehicle 200 and that control and cause climate control (e.g., air flow, air temperature, etc.) in a cabin of the vehicle 200. The navigation system components can include a satellite receiver for satellite-based positioning of the vehicle 200. Such powertrain components, climate control components, and navigation system components are shown as part of vehicular components 220 in FIG. 2.

The computing component 210 can be communicatively coupled with the vehicular components 220 (e.g., over one or more controlled area network (CAN) buses). Further, computing component 210 can be communicatively coupled with an external set of computers 270 over a network 250 (e.g., wirelessly via cellular connection, a Wi-Fi connection, or other types of connections over the Internet). Although the computing component 210 is described as being a component of the infotainment system, the embodiments of the present disclosure are not limited as such. For example, the computing component 210 can be integrated into another vehicular system or can be a standalone system installed in the vehicle 200. Alternatively, the computing component 210 need not be installed in the vehicle 200 and may instead be selectively communicatively coupled with one or more vehicular systems and/or components. For example, the computing component 210 can be a component of a mobile device that can be connected (e.g., via a pairing protocol) with a vehicular interface of the vehicle 200 (e.g., a BLUETOOTH interface).

In the illustration of FIG. 2, the cabin's vehicle is shown as including two rows of seats and two columns of seats, thereby forming a 4×4 matrix of seats that can be associated with four zones (e.g., the zones 101-14 of FIG. 1). A different number of rows and columns can be possible (e.g., a third row of seats is possible, where the second row and/or the third can include more than two seats). Generally, each seat can be associated with a set of endpoints of the infotainment system (e.g., display(s), speaker(s), and optionally dedicated microphone(s), where this set is communicatively coupled with the computing component 210 and can be associated with a zone.

In an example, the displays 212 are installed in different locations within the cabin of the vehicle 200. For instance, at least one display is installed in the front left part of the cabin and can be associated with a driver zone (e.g., the first zone 101 of FIG. 1), at least one display is installed in the front right part of the cabin and can be associated with a front passenger zone (e.g., the second zone 101 of FIG. 1), at least one display is installed in the rear left part of the cabin and can be associated with a rear left passenger zone (e.g., the third zone 103 of FIG. 1), and at least one display is installed in the rear right part of the cabin and can be associated with a rear right passenger zone (e.g., the fourth zone 104 of FIG. 1). Other displays can be installed in the cabin and can be associated with multiple zones (e.g., a front center console display that can be available to both the driver zone and the front passenger zone, an infotainment head unit that can also be available to both front zones, a rear ceiling or console display that can be available to both the rear zones, etc.). A display can be a device that includes, among other things, a set of processors, a set of memory, and an output screen such as a touchscreen and/or heads up display (HUD). A display can be installed in front of a seat to provide display output to that seat. A display can be integrated with other components of the vehicle 200. For example, in the case of the driver zone, a display can be integrated with the center console that provides other vehicular outputs (e.g., speed, RPM, system messages, alerts, navigation data, etc.).

Similarly, the speakers 214 are installed in different locations within the cabin of the vehicle 200. For instance, at least one speaker is installed in the front left part of the cabin and can be associated with the driver zone, at least one speaker is installed in the front right part of the cabin and can be associated with the front passenger zone, at least one speaker is installed in the rear left part of the cabin and can be associated with the rear left passenger zone, and at least one speaker is installed in the rear right part of the cabin and can be associated with the rear right passenger zone. Other speakers can be installed in the cabin and can be associated with multiple zones (e.g., a front center console speaker that can be available to both the driver zone and the front passenger zone, a rear console speaker that can be available to both the rear zones, a ceiling speaker can be available to all zones, etc.). A speaker can be integrated in a display and/or another cabin component (e.g., in a headrest of a seat).

In an example, the microphones 216 are seat dedicated microphones, where each one of them is uniquely associated with a seat. In this example, the microphones 216 are installed in different locations within the cabin of the vehicle 200. For instance, at least one microphone is installed in the front left part of the cabin and can be associated with the driver zone, at least one microphone is installed in the front right part of the cabin and can be associated with the front passenger zone, at least one microphone is installed in the rear left part of the cabin and can be associated with the rear left passenger zone, and at least one microphone is installed in the rear right part of the cabin and can be associated with the rear right passenger zone. A microphone can be integrated in a display, a speaker, and/or another cabin component (e.g., in a backrest of a seat). Alternative or in addition to the microphones 216, the microphones 218 can be installed in the cabin of the vehicle 200. The microphones 218 can include an array of microphones that support audio beamforming. In such a case, the array can be installed in one location in the vehicle 200 (e.g., around the center point of the ceiling in the cabin).

Configuration data can be stored and can associate each display 212, each speaker 214, and, as applicable, each microphone 216 with a zone by associating the corresponding device identifiers with the zone identifier. Operational data can also be stored and associate each zone with an operational mode that applies to the zone by associating zone identifiers with operational mode identifiers. Permission data can also be stored and associate each zone with a set of permissions by associating each zone identifier with a permission identifier(s) and/or a permission descriptor(s). The computing component 210 can include a set of data stores that store the configuration data, the operational data, and the permission data, although a set of data stores external to the vehicle 200 (e.g., included in the set of computers 270) can redundantly or alternatively store any of the configuration data, the operational data, or the permission data. If stored externally, the configuration data, the operational data, or the permission data can be associated with a vehicle identifier unique to the vehicle 200 (e.g., a vehicle identification number (VIN) and/or an account identifier of an account associated with the vehicle 200 (e.g., an account of the owner, operator, driver, or passenger of the vehicle 200).

In operation, the computing component 210 receives input data sent from an endpoint installed in the vehicle 200. In the case when the endpoint is a display, the input data can include text data generated by the display in response to user input at the display. This input data can be associated with a display identifier that the computing component 210 can map to a zone identifier based on the configuration data. As such, the computing component 210 can determine that the input data has originated from a particular zone. In the case when the endpoint is a seat dedicated microphone, the input data can include audio data generated by the microphone in response to a user natural language utterance detected by the microphone. This input data can be associated with a microphone identifier that the computing component 210 can map to a zone identifier based on the configuration data. As such, the computing component 210 can also determine that the input data has originated from a particular zone. In the case when the endpoint is the microphone array, the input data can include audio data generated by the microphone array in response to a user natural language utterance detected by the microphone array. Beamforming techniques are used to determine a beam direction from which the audio has originated relative to the microphone area. Data indicated the direction can be sent along with the audio data to the infotainment system. The computing component 210 can map the direction, as indicated in the data, to a zone identifier based on the configuration data. As such, the computing component 210 can also determine that the input data has originated from a particular zone. Alternatively, the configuration data can be accessible to or stored by audio processing circuitry of the microphone array that then can determine the zone identifier that corresponds to the beam audio direction and can send this zone identifier along with the audio data to the computing component 210.

In an example, the input data can request a particular operation to be performed (E.g., play audio content). In the case of audio data, the computing component 210 can detect a wake word and accordingly record and send the audio data to the set of computers 270. Additionally or alternatively, the computing component 210 can perform natural language processing (e.g., automatic speech recognition (ASR) processing, natural language understanding (NLU) processing, and/or other types of natural language processing (NLP) algorithms) on the input data to then send the resulting data or a command (e.g., to start an audio streaming session) to the set of computers 270. In either case, the set of computers 270 receives and processes data (e.g., text data, audio data, NLP data) and/or a command from the computing component 210 to then trigger execution of the operation and send result data and/or a command to the computing component 210.

In an example, the set of computers 270 includes an NLP component 272 that can perform NLP operations on the received data to determine, among other things, an intent (e.g., play audio) and tokens (e.g., particular audio content and/or audio library). The set of computers 270 also includes a content processing component 278 usable for when the operation relates to content to be output in the cabin of the vehicle 200. For instance, this component 278 can facilitate the establishment of an audio session with a content source from which audio data can be streamed to the computing component 210. In certain implementations, the set of computers 270 also includes permissions processing component 274 that stores the permission data described herein.

In such implementations, the computing component 210 can query the permissions processing component 274 by using a zone identifier corresponding to a zone to determine the set of permissions associated with the zone, where such permissions can be indicated in a query result.

Furthermore, the set of computers 270 can include a profile processing component 276 that stores profile data. The profile data can correspond to a profile of a rider (e.g., a driver or a passenger) of the vehicle 200. The computing component 210 can identify the profile using one or more techniques such as upon a user login via a display 212 and/or a microphone 216 and can send the profile identifier to the profile processing component 276. Alternatively or additionally, the profile processing component 276 can identify the profile based on other data received from computing component 210. For instance, audio fingerprinting techniques can be applied to the audio data received from the computing component 210 to identify the profile. Or a device identifier of a mobile device paired with the display 212 and/or the microphone 216 can be received and mapped to the profile identifier.

The profile data can be used in different way. In one example, the profile data is used to customize the user experience at a seat of the vehicle 200 (e.g., in a zone). For instance, the profile data indicates user settings or preferences to use a particular content streaming application. In this case, when a content operation is requestees, the content streaming application is used for the application session. In another illustration, some of the profile data can be used to customize the content presented at a GUI of the display 212 (e.g., by including the rider's name and presenting and arranging GUI components on the GUI according to user settings).

In other example use of the profile data, the set of permissions available to the zone can also depend on the profile data. For instance, if the profile data indicates that the rider is the owner or a primary user of the vehicle 200, the set of permissions can correspond to the full set of controls. In comparison, if the profile data indicates that the rider is a passenger or a secondary user of the vehicle 200, the set of permissions can be a limited set.

Upon the processing of data received from the computing component 210, the set of computers 210 can send a command to the computing component 210 related to the requested operation (e.g., to start an application session with a content source from which content data can be streamed).

In certain situations, a requested operation need not be content related, but can relate to controls over one or more of the vehicular components 220. In certain implementation, the corresponding input data can be processed as described herein above (e.g., fully by the computing component 210 and/or in a distributed manner between the computing component 210 and the set of computers 270). Here, the permissions can also be checked to determine if such operations can be authorized. If so, the computing component 210 can send a command to the corresponding vehicular components 220 to trigger the operation. For instance, in the case of climate control, input data originating from a zone other than the driver zone can be permitted to control the air flow and temperature in that zone only. In comparison, input data originating from the driver zone can be permitted to control the air flow and temperature in any zone. Input data requesting particular navigation to a destination or particular powertrain setting (e.g., to set a cruise control speed) can be permitted only when originating from the driver zone.

Although FIG. 2 illustrates various computing components 272, 274, 276, and 278 that may be implemented remotely from the vehicle 200, some or all of these computing components 272, 274, 276, and 278 can be implemented locally to the vehicle 200. For example, any or all of the NLP component 273, permissions processing component 274, profile processing component 276, and/or communications component 278 can be included in the computing component 210 of the vehicle 200.

Figure 3:
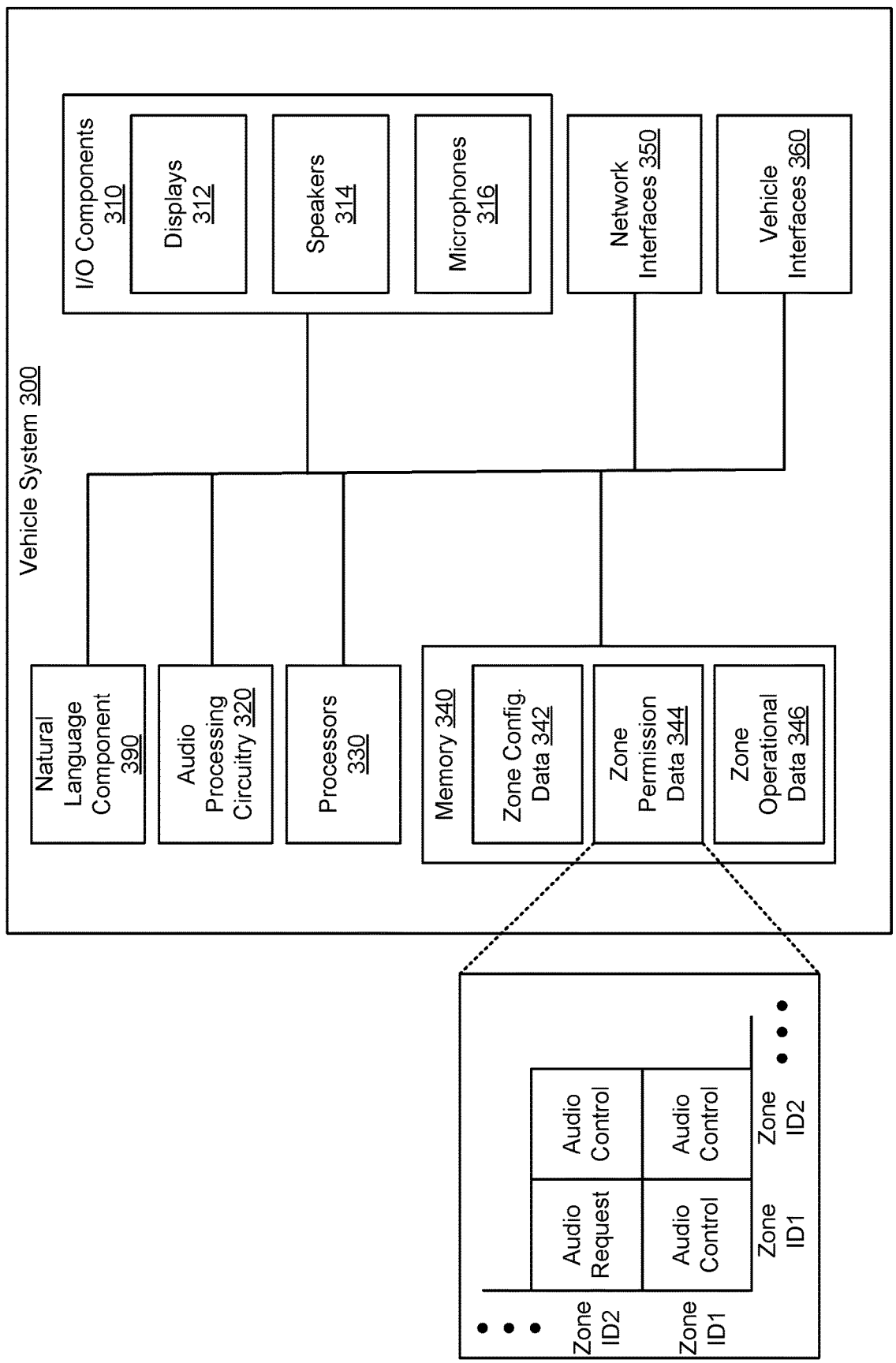
FIG. 3 illustrates an example of components of a vehicle system, according to embodiments of the present disclosure.

FIG. 3 illustrates an example of components of a vehicle system 300, according to embodiments of the present disclosure. As illustrated, the vehicle system 300 can be an infotainment system installed in a vehicle and include input/output (I/O) components 310 such as displays, speakers 315, and microphones 316. Such I/O components can be distributed in a cabin of the vehicle, as discussed herein above in connection with FIG. 2. The vehicle system 300 can also include audio processing circuitry 320, processors 330, and memory 340, which may form, at least in part, a computing component such as the one described herein above in connection with FIG. 2.

In an example, the audio processing circuitry 320 can be configured to process, at least in part, audio data generated by the microphones 316 and to output audio data to the speakers 314. An example of the audio processing circuitry 320 is further described in connection with the next figure. The processors 330 can execute program codes (e.g., computer-readable instructions) stored in the memory 340 and related to processing input data received from multiple sources including the displays 312, other vehicular components (e.g., a navigation component, a climate control component, a powertrain component), and sources external to the vehicle (e.g., to buffer, reformat, de-compress, decrypt, and/or perform other operations on content data received from an external content source) and/or related to output data to send to the displays 312, the other vehicular systems, and/or destination endpoints external to the vehicle. In addition to storing the program codes, the memory 340 can store any of zone configuration data 342, zone permission data 344, and/or zone operational data 346 as described in connection with FIG. 2. In an example, the permission data 344 may associate each zone with a set of permissions by associating each zone identifier with a permission identifier(s) and/or a permission descriptor(s). Further, the permission data 344 can indicate the permissions of each zone relative to the content output in the remaining zones by associating the zone identifier of each zone with permission identifier(s) and/or permission descriptor(s) and with zone identifiers of other zones. FIG. 3 illustrates this inter and intra zone permissions by showing an example data structure usable for the permission data 344. The data structure can include the zone identifier (shown as "zone ID1," "zone ID2," . . . ) and the permissions (e.g., permission identifier(s) and/or permission descriptor(s)). As illustrated, a first zone (e.g., "zone ID1" shown on the vertical axis) has audio control permissions for the audio output in the first zone and the second zone (e.g., "zone ID1" and "zone ID2" shown on the horizontal axis). In other words, the first zone can control (e.g., play, rewind, fast forward, etc.) the audio output in both zones. In comparison, the second zone (e.g., "zone ID2" shown on the vertical axis) has audio control permissions in the second zone (e.g., "zone ID2" shown on the horizontal axis) and audio request permissions in the first zone (e.g., "zone ID1" shown on the horizontal axis). In other words, the second zone can control (e.g., play, rewind, fast forward, etc.) the audio output in the second zone only and can request the first zone to change the audio output in the second zone. Of course, these specifics permissions are used herein for illustrative purposes only and other permissions can be defined. Further, the data structure is used herein for illustrative purposes only and other data structures can be defined.

As further illustrated in FIG. 3, the vehicle system 300 include network interfaces 350 and vehicle interfaces 360. The network interfaces 350 can include a set of network interface cards (NICs) that enable the computing component to communicate with computer components external to the vehicle over one or more networks, such as with the set of computers 270 over the network 250. The NICs can implement various types of communication technologies, such as long term evolution (LTE or 4G) cellular communication technologies, new radio (NR or 5G) cellular communication technologies, Wi-Fi cellular communication technologies, and the like. The vehicle interfaces 360 can include a set of NICs and/or data ports for communications with other vehicular components (e.g., the vehicular components 220 of FIG. 2). For example, the vehicle interfaces 360 support CAN communications.

Component of the vehicle system 300 can be interconnected using different technologies. For instance, a memory bus can communicatively couple the memory 340 and the processors 330 and another memory bus can communicatively couple the memory 340 and the audio processing circuitry 330. Wireless, short range communications (e.g., BLUETOOTH) and/or wires connections (e.g., high definition multimode interface connections and inter-integrated circuit connections) can be used to communicatively couple the I/O components 340 with the computing component.

In an example, the vehicle system 300 can also include a natural language component 390 that processes audio data generated by the microphones 316 (independently of, after, or before processing of such audio data by the audio processing circuitry 320). In an example, upon detection by the audio processing circuitry 320 of a wake word, the audio processing circuitry 320 can send audio data to the natural language component 390. In turn, the natural language component 390 performs speech processing on the audio data. An output of the speech processing can indicate a command to control vehicle functions, such as to initiate an outgoing phone call, to accept an incoming phone call, control audio/video outputs, control climate control components, control a navigation component, control a powertrain component, and the like.

The natural language component 390 can include, among other things, a natural language processing (NLP) component, skill component, a language output component, a user recognition component, and a profile storage component. The NLP component can include an automatic speech recognition (ASR) component and a natural language understanding (NLU) component. The language output component can include a natural language generator (NLG) component and a text to speech (TTS) component). The skill component can include skills and/or can have access to a skill system remote from the vehicle and can be configured to execute commands based on the output of the natural language processing component.

The NLG component can generate text for purposes of TTS output to a user. For example, the NLG component may generate text corresponding to instructions corresponding to a particular action for the user to perform. The NLG component may generate appropriate text for various outputs as described herein. The NLG component may include one or more trained models configured to output text appropriate for a particular input. The text output by the NLG component may become input for the TTS component. Alternatively or in addition, the TTS component may receive text data from a skill or other system component for output.

The NLG component may include a trained model. The NLG component generates text data such that the output text data has a natural feel and, in some embodiments, includes words and/or phrases specifically formatted for a requesting individual. The NLG component may use templates to formulate responses. The NLG component may include models trained from the various templates for forming the output text data. For example, the NLG component may analyze transcripts of local news programs, television shows, sporting events, or any other media program to obtain common components of a relevant language and/or region. As one illustrative example, the NLG component may analyze a transcription of a regional sports program to determine commonly used words or phrases for describing scores or other sporting news for a particular region. The NLG component may further receive, as inputs, a dialog history, an indicator of a level of formality, and/or a command history or other user history such as the dialog history.

The NLG component may generate dialog data based on one or more response templates. For example, the NLG component may select a template in response to the question, "What is the temperature of the vehicle cabin?" of the form: "the temperature is $temperature_information$." The data for "$temperature_information$" can be retrieved from another vehicle component, such as from a climate control component. The NLG component may analyze the logical form of the template to produce one or more textual responses including markups and annotations to familiarize the response that is generated. In some embodiments, the NLG component may determine which response is the most appropriate response to be selected. The selection may, therefore, be based on past responses, past questions, a level of formality, and/or any other feature, or any other combination thereof. Responsive audio data representing the response generated by the NLG component may then be generated using the text-to-speech component.

In at least some embodiments, the natural language component 390 may be configured to handle only a subset of the natural language user inputs that may be handled by the set of computers 370. For example, such subset of natural language user inputs may correspond to local-type natural language user inputs, such as those controlling devices or components associated with the vehicle. In such circumstances the on-device language processing components may be able to more quickly interpret and respond to a local-type natural language user input, for example, than processing that involves the set of computers 370.

The ASR component is configured to receive audio data and to recognize speech in the audio data 2011, and the NLU component is configured to determine a user intent from the recognized speech, and to determine how to act on the user intent by generating NLU output data which may include directive data (e.g., data for a command that instructs a component to perform an action). In some cases, a directive may include a description of the intent and/or an identifier of component(s), and an operation to be performed at the component(s). Directive data may be formatted using Java, such as JavaScript syntax, or JavaScript-based syntax. This may include formatting the directive using JSON. An NLU hypothesis (output by the NLU component) may be selected as usable to respond to a natural language user input.

In at least some embodiments, the skill component may correspond to one or more domains that are used in order to determine how to act on a spoken input in a particular way, such as by outputting a directive that corresponds to the determined intent, and which can be processed to implement the desired operation. The skill component may include, without limitation, a control skill component (or device control domain) to execute in response to spoken inputs corresponding to an intent to control another component(s) in the vehicle, a music skill component (or music domain) to execute in response to spoken inputs corresponding to an intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the natural language component may interface with one or more skill systems 2025. For example, a skill system may be located in remotely from the vehicle and communications therewith can be over a network(s) However, the skill system may be configured in a local environment of the vehicle. As used herein, a "skill" may refer to a skill component, a skill system, or a combination of a skill component and a corresponding skill system.

The natural language component 390 may be configured to recognize multiple different wake words and/or perform different categories of tasks depending on the wake word. Such different wake words may invoke different processing components. For example, detection of the wake word "Alexa" may result in sending audio data to certain language processing components/skills for processing while detection of the wake word "Car" may result in sending audio data different language processing components/skills for processing.

One or more of the herein described components may implement one or more trained machine learning models. Various machine learning techniques may be used to train and operate such models. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the trained models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Neural networks may also be used to perform ASR processing including acoustic model processing and language model processing. In the case where an acoustic model uses a neural network, each node of the neural network input layer may represent an acoustic feature of a feature vector of acoustic features, such as those that may be output after the first pass of performing speech recognition, and each node of the output layer represents a score corresponding to a subword unit (such as a phone, triphone, etc.) and/or associated states that may correspond to the sound represented by the feature vector. For a given input to the neural network, it outputs a number of potential outputs each with an assigned score representing a probability that the particular output is the correct output given the particular input. The top scoring output of an acoustic model neural network may then be fed into an HMM which may determine transitions between sounds prior to passing the results to a language model.

In the case where a language model uses a neural network, each node of the neural network input layer may represent a previous word and each node of the output layer may represent a potential next word as determined by the trained neural network language model. As a language model may be configured as a recurrent neural network which incorporates some history of words processed by the neural network, the prediction of the potential next word may be based on previous words in an utterance and not just on the most recent word. The language model neural network may also output weighted predictions for the next word.

Processing by a neural network is determined by the learned weights on each node input and the structure of the network. Given a particular input, the neural network determines the output one layer at a time until the output layer of the entire network is calculated.

Connection weights may be initially learned by the neural network during training, where given inputs are associated with known outputs. In a set of training data, a variety of training examples are fed into the network. Each example typically sets the weights of the correct connections from input to output to 1 and gives all connections a weight of 0. In another embodiment, the initial connection weights are assigned randomly. As examples in the training data are processed by the neural network, an input may be sent to the network and compared with the associated output to determine how the network performance compares to the target performance. Using a training technique, such as back propagation, the weights of the neural network may be updated to reduce errors made by the neural network when processing the training data.

Figure 4:
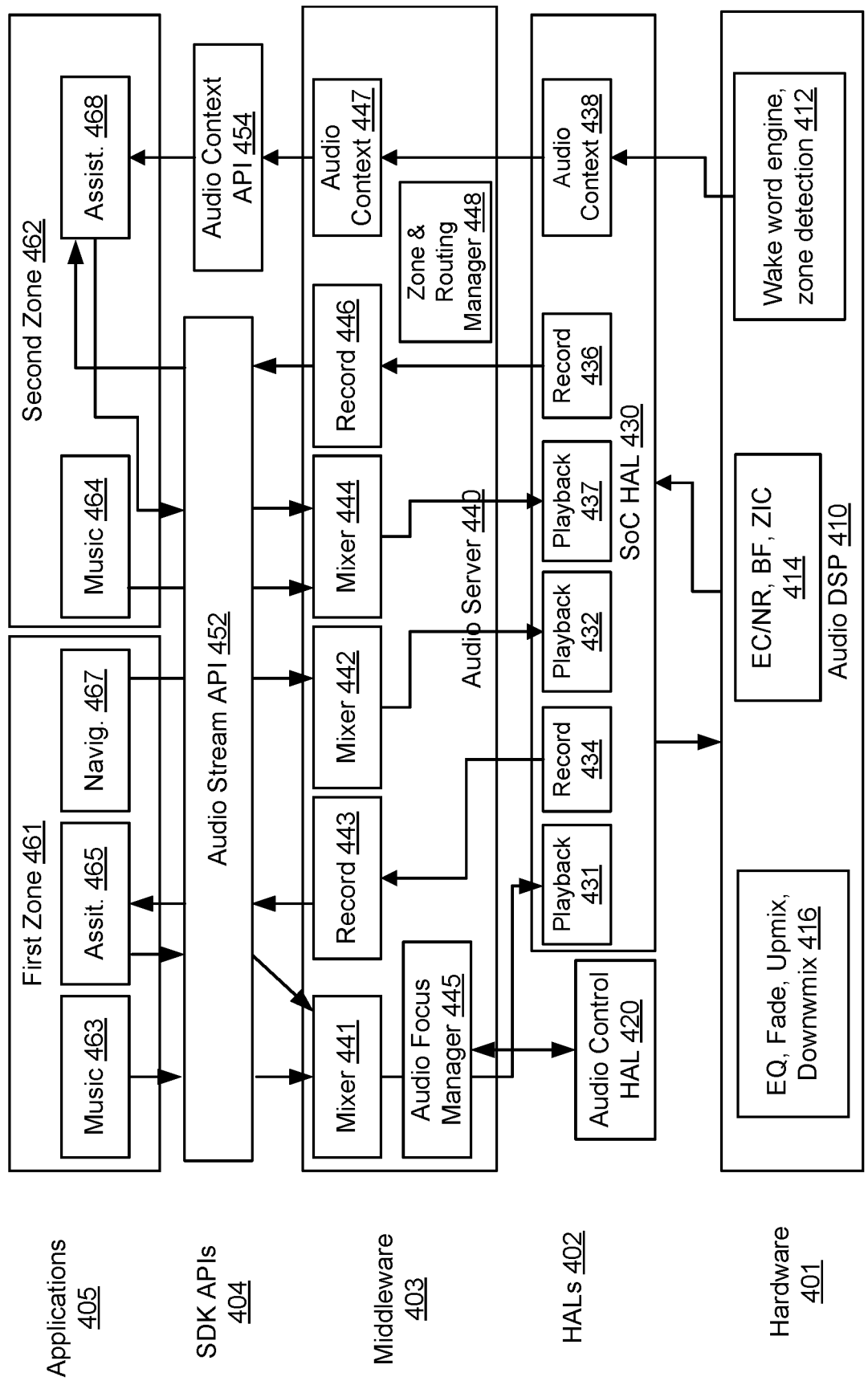
FIG. 4 illustrates an example of audio processing circuitry of a vehicle system, according to embodiments of the present disclosure.

FIG. 4 illustrates an example of audio processing circuitry of a vehicle system, according to embodiments of the present disclosure. The audio processing circuitry is an example of the audio processing circuitry 320 of FIG. 3. As illustrated, the includes hardware 401 and software components such as hardware abstraction layers (HALs) 402, middleware 403, software development kit (SDK) application programming interfaces (APIS) 404, and applications 405.

The hardware 401 can include an audio digital signal processor (DSP) 410 that provides among inputs and output operations. As far as the input operations, the audio DSP 410 implements a wake word engine and zone detection component 412. This component 412 can receive audio data from a seat-dedicated microphone or from a microphone area and detects whether a wake word is present in the audio data. If so, the wake word engine and zone detection component 412 records the audio data (e.g., the portion starting with the data corresponding to wake word or after the subsequent data and ending when no additional audio data is received). In the case of seat-dedicated microphone, the wake word engine and zone detection component 412 detects a zone from which the audio data has originated. In particular, the audio data can be received along with metadata, where this metadata includes a microphone identifier. The wake word engine and zone detection component 412 can use the microphone identifier in a look-up of configuration data to determine a zone identifier that corresponds to the zone. In the case of a microphone array, the wake word engine and zone detection component 412 also detects a zone from which the audio data has originated. In particular, the audio data can be received along with metadata, where the metadata herein includes an audio beam direction. The wake word engine and zone detection component 412 can use the beam direction in a look-up of configuration data to determine a zone identifier that corresponds to the zone. Upon the processing of the audio data, the wake word engine and zone detection component 412 can generate an audio context 438 that may be passed to a system on chip (SoC) HAL 430, where this audio context 438 indicates that the wake word is detected and the zone identifier and that the audio is recorded.

As far as the input operations, the audio DSP 410 also implements an echo cancellation (EC) and/or noise reduction (NR), beamforming (BF), and zone interference cancelation (ZIC) component 414. The component 414 can cancel echo and/or reduce the noise in the zone based on the audio that is being output in the zone (e.g., by a speaker associated with the zone). In case of using a microphone array, the component 414 can amplify the audio signal corresponding to the audio beam direction. Based on audio output(s) in the remaining zone(s), the component 414 can cancel the interference of such audio output(s) with the audio that is being output in the zone. The resulting audio data is recorded and can be passed to the SoC HAL 430.

As far as the output operations, the audio DSP 410 implements an equalization (EQ), fade, up-mix, and down-mix component 416. This component 416 can send, as outputs, audio data to the relevant speakers in the zones, shared speakers of the cabin, and/or audio amplifiers of the vehicle. In particular, the component 416 receives input audio data from the SoC HAL 430 and performs EQ, fade, up-mix, and/or down-mix operations thereon to then generate and send output audio data.

The HALs 402 include an audio control HAL 420 and the SoC HAL 430. The audio control HAL 420 provides a layer of programming that enables the processing external audio streams such as audio alerts generated by other vehicular components (e.g., a safety alert about collision avoidance). The audio control HAL 420 outputs data to an audio focus manager 445 of an audio server 440 of the middleware 440, where this data can set the audio focus (e.g., such that the external audio is presented in the foreground by ducking other audio outputs). The SoC HAL 420 provides a layer of programming that enables the processing of audio contexts and input audio data received from the audio DSP 410 and of output audio data sent to the audio DSP 410. For example, an audio context corresponding to input audio data associated with a zone is stored. The input audio data itself is recorded also. Playback operations can be programmed to send the output audio data.

The middleware 403 includes an audio server 440. In addition to the audio focus manager 445, the audio server 440 includes a zone and routing manager 448. The zone and routing manager 448 can receive configuration data indicating the mapping of devices (e.g., displays, speakers, seat-dedicated microphones) to zones. Based on such configuration data, the zone and routing manager 448 can route output audio data to the zones (e.g., to particular speakers in particular zones by including speaker identifiers in metadata of the output audio data). Further, the audio server 440 can receive and store an audio context 447 from the SoC Hall 430, where this audio context 447 corresponds to the audio context 438 and can pass the audio context 447 in an audio context API 454 of the SDK APIs 404 to an application executing for the relevant zone. Input audio data that was recorded by the SoC HAL 430 can also be received and recorded by the audio server 440 and passed to the application via an audio stream API 452 of the SDK APIs 404. The audio server 440 can pass output audio data to the SoC HAL 430 (e.g., to a playback program), where this output audio data can correspond to audio data received by the audio server 440 from one or more applications. If received from multiple applications, the audio data can be mixed by the audio server 440.

The applications 405 can include sets of applications, where each set is associated with a zone. The sets can be different in size and/or elements. Different types of applications are supported including, for example, music applications, smart assistant applications (also referred to as personal assistant applications), navigation applications, messaging applications, gaming applications, phone call applications, and the like. The audio context can indicate that input audio data includes a wake word and is associated with a zone. In this case, a smart assistant application executing for that zone can receive the input audio data for further processing (where this further processing can be local to the computing component and/or can be distributed between the computing component and a set of computers as described in connection with FIG. 2). An audio output of an application can be sent to the audio server 440 that then routes it, via the SoC HAL 430 and the audio DSP 410, to the speaker(s) in the proper zone. In particular, the application can be associated with the zone identifier of the zone for which the application is executing. The metadata of the output audio data can include the zone identifier. The zone and routing manager 448 can then determine the speaker identifier(s) and can add such speaker identifier(s) to the metadata for routing purposes.

To illustrate, consider the example of two zones: a first zone 461 and a second zones 462. A music application 463, a smart assistant application 465, and a navigation application 467 are executed for the first zone 461. In this illustration, audio data is recoded 434 by the SoC HAL 430 and corresponds to a request to change a music output (e.g., a request to change the currently played music title). This audio data is also recoded 443 by the audio server 440 that then passes it to the smart assistant application 465. Upon the processing of the audio data, the smart assistant application 465 sends response data (e.g., a text to message (TTS) response) indicating that the requested music is about to start and the music application 463 can send the related music data via the audio stream API 452. The response data and the response data can be mixed by a mixer 441 of the audio server 440 and sent, along with a first zone identifier, to a playback program 431 of the SoC HAL 430. In turn, the SoC HAL 430 outputs the mixed audio data to the audio DSP 410 along with the first zone identifier. The audio DSP 410 then further processes the mixed audio data (e.g., via the EQ, fame, up-mix, and/or down-mix component 416) and outputs it to the relevant speaker(s) of the first zone 461.

In also this illustrative example, navigation data is generated by the navigation application 467 (e.g., indicating an upcoming road exit to take). The navigation data is sent via the audio stream API 452 to a mixer 442 of the audio server 440 and sent, along with a first zone identifier, to a playback program 432 of the SoC HAL 430. In turn, the SoC HAL 430 outputs the navigation data to the audio DSP 410 along with the first zone identifier. The audio DSP 410 then further processes the navigation data (e.g., via the EQ, fame, up-mix, and/or down-mix component 416) and outputs it to the relevant speaker(s) of the first zone 461. In the case when the first zone 461 is a driver zone and the navigation data being relevant to operating the vehicle, the navigation data may not be sent to a speaker of the second zone 462 or a to speaker that is shared across the different zones.

Furthermore, a smart application 468 is executed for the second zone 462 and, thus, is associated with a second zone identifier of the second zone 462. Here, audio data is sent by the audio DSP 410 along with the audio context 438 and corresponds to a request to start a music output. The audio data is recorded 436 by the SoC HAL 430. Given than the recoded audio data is passed to the audio server 440 that also records it 446. The audio context 438 is also passed, whereby the audio server 440 determines that the audio data is associated with the second zone. Accordingly, the recorded audio data is passed to the smart assistant application 468 via the audio stream API and the audio context 447 is also passed to the smart assistant application 468 via the audio context API 454. Upon the processing of the audio data, the smart assistant application 468 sends response data (e.g., a TTS response) indicating that the requested music is about to start and a music application 464 is executed for the second zone. The music application 464 can send the related music data via the audio stream API 452. The response data and the response data can be mixed by a mixer 444 of the audio server 440 and sent, along with the second zone identifier, to a playback program 437 of the SoC HAL 430. In turn, the SoC HAL 430 outputs the mixed audio data to the audio DSP 410 along with the second zone identifier. The audio DSP 410 then further processes the mixed audio data (e.g., via the EQ, fame, up-mix, and/or down-mix component 416) and outputs it to the relevant speaker(s) of the second zone 461.

Herein next, examples of different operational modes are described in connection with audio output in two zones in the interest of clarity of explanation. However, the embodiments are not limited as such and similarly and equivalently apply to other types of content outputs (e.g., video outputs) in two zones or a different number of zones.

Figure 5:
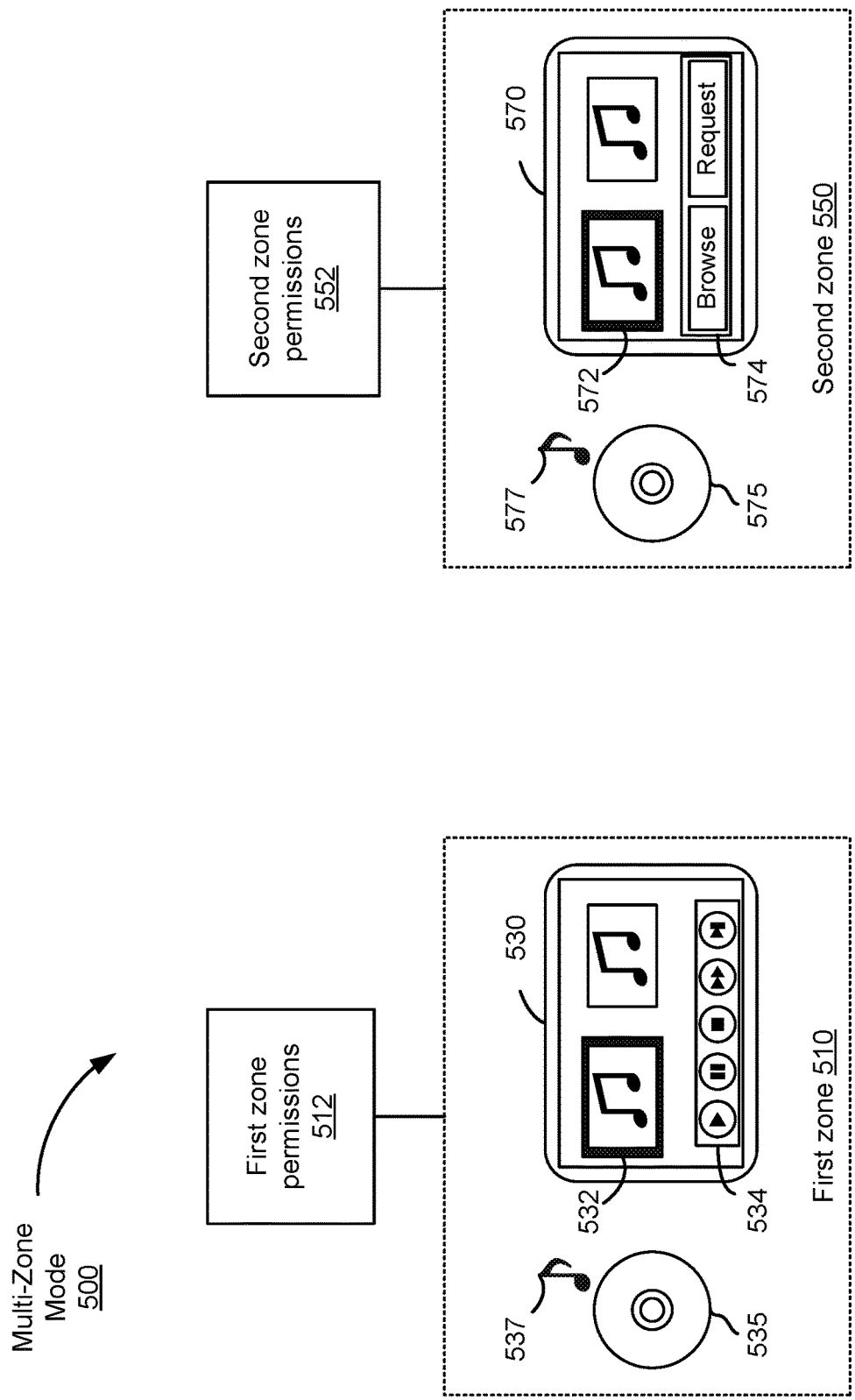
FIG. 5 illustrates an example of a multiple zone mode, according to embodiments of the present disclosure.

FIG. 5 illustrates an example of a multiple zone mode 500, according to embodiments of the present disclosure. The multiple zone mode 500 can be referred to as a multi-zone mode or a shared mode. Generally, the multiple zone mode 500 is an operational mode that applies to multiple zones. A first zone is designated as a primary zone, whereas any remaining zone can be designated as a secondary zone. The primary zone can be associated with relatively more permissions that any secondary zone. Each zone can be associated with at least one speaker and one display. Audio can be output by a speaker in each zone, where the audio output can be time synchronized across the zones. The display in each zone can be used in multiple ways. In a first example way, the display is used to identify the audio that is being output by the speaker(s) of the zone. In a second example way, the display is used to provide GUI components configured according to the set of permissions associated with the zone.

In the illustration of FIG. 5, a first zone 510 is associated with a first display 530 and a first speaker 535. For example, configuration data can be stored (e.g., by a computing component) and can include a first zone identifier of the first zone 510, a first display identifier of the first display 530, and a first speaker identifier of the first speaker 535. The first zone 510 can also be associated with first zone permissions 512 based on a number of factors, such as the operational mode being a multiple zone mode 500 (whereby the first zone 510 is designated as a primary zone) and/or a profile of a user of the first zone 510. For example, permission data can be stored (e.g., by the computing component) and can include the first zone identifier and permission identifiers (that can be mapped to permission descriptors that may be stored in a different data store) or the permission descriptors. The first zone 510 can also be associated with the multiple zone mode 500. For example, operational data can be stored (e.g., by the computing component) and can include the first zone identifier and a mode identifier of the multiple zone mode 500 and a primary zone designation.

Similarly, a second zone 550 is associated with a second display 570 and a second speaker 575. For example, configuration data can be stored (e.g., by the computing component) and can include a second zone identifier of the second zone 550, a second display identifier of the second display 570, and a second speaker identifier of the second speaker 575. The second zone 550 can also be associated with second zone permissions 552 based on a number of factors, such as the operational mode being a multiple zone mode 500 (whereby the second zone 550 is designated as a secondary zone) and/or a profile of a user of the second zone 550. For example, permission data can be stored (e.g., by the computing component) and can include the second zone identifier and permission identifiers (that can be mapped to permission descriptors that may be stored in a different data store) or the permission descriptors. The second zone 550 can also be associated with the multiple zone mode 500. For example, operational data can be stored (e.g., by the computing component) and can include the second zone identifier and the mode identifier of the multiple zone mode 500 and a secondary zone designation.

Given the operational data indicating that both zones are associated with the multiple zone mode 500, the computing component can send first audio data to the first speaker 535 and second audio data that corresponds to the first audio data to the second speaker 575. In turn, the first speaker outputs first audio 537 and the second speaker outputs second audio 577 in a time synchronized manner. Alternatively, the computing component can send first audio data to the first speaker 535 that then presents this first audio data as the first audio 537 and sends it forward using, for example, a mirroring technique to the second speaker 575 that outputs it as the second audio 577.

Further, the computing component can send first metadata about the first audio data to the first display 530 and metadata about the second audio data to the second display 570. In turn, the first display 530 outputs a first GUI that shows an identifier 532 of the first audio 537 that is being output by the first speaker 535 and other data, such as audio content that is queued in an audio library. Similarly, the second display 570 outputs a second GUI that shows an identifier 572 of the second audio 577 that is being output by the second speaker 575 and other data, such as audio content that is queued in an audio library. This type of data that is presented in the second GUI can be the same as the data described so far as being presented in the first GUI. Alternatively, the computing component can send first metadata to the first display that then uses it for driving the first GUI can forward it, using a mirroring technique, to the second display 570 for use thereat in the second GUI.

Given the first zone permissions 512, the computing component sends a command to the first display 530 to enable a control bar 534 that provides various content controls over the audio outputs in both zones 510 and 550. In turn, the first display 530 includes a GUI control component in the first GUI showing the control bar 534 and including, for example, a play control, a pause control, a stop control, a fast forward control, a skip control, and the like. Upon a selection of any of such controls via the first GUI, the first display 530 sends the corresponding input data to the computing component that, in turn, processes this input data to determine an operation to be performed on the audio outputs (e.g., paly, pause, stop, fast forward, skip). Next, the computing component causes the operation to be performed in both zones 510 and 550. For example, in the case of a pause operation, the computing component sends a first command to the first speaker 535 to pause the first audio output, a second command to the second speaker 575 to pause the second audio output, a third command to the first display 530 to indicate the pausing, and fourth command to the second display 570 to also indicate the pausing.

Herein above, the input data is described as being received via the first GUI of the first display 530. Nonetheless, input data can be audio data generated by a set of microphones and associated with the first zone 510. Such audio data can be processed locally by the computing component or remotely by an NLP component to determine the requested operation.

Given the second zone permissions 552, the computing component sends a command to the second display 570 to enable a control bar 574 that provides limited content controls available only in the second zone 520. In turn, the second display 570 includes a GUI control component in the second GUI showing the control bar 574 and including, for example, a browse option and a request option, and the like. The browse selection can be used to browse queued audio content and/or one or more audio libraries. The request option can be selected to request particular audio content to be output and/or the queuing of a particular audio library. Upon a selection of the request option via the second GUI, the second display 570 sends the corresponding input data to the computing component that, in turn, processes this input data to determine a request to change the audio output and requested audio content and/or audio library. Next, the computing component causes the first display 530 to present, in the first GUI, an indication of the request. If additional input data is received from the first display 530 and indicates an approval (or, equivalently, additional audio data associated with the first zone 510 is received and processed to determine the approval), the computing component can cause the change to be performed in both zones 510 and 20. For example, the computing component sends a first command to the first speaker 535 and, as applicable, third audio data to present the third audio data, a second command to the second speaker 575 and, as applicable, fourth audio data corresponding to the first audio data present the fourth audio, a third command to the first display 530 to indicate the presentation of the third audio data, and fourth command to the second display 570 to indicate the presentation of the fourth audio data. If additional input data is received from the first display 530 and indicates a denial (or, equivalently, the additional audio data associated with the first zone 510 is received and processed to determine the denial), the computing component can cause the second display 570 to present an indication of the denial in the second GUI and/or the second speaker 575 to indicate the denial (e.g., by mixing a TTS message indicating the denial with the second audio that is being output by the second speaker 575).

Herein above, the input data received in the second zone is described as being received via the second GUI of the second display 570. Nonetheless, input data can be audio data generated by a set of microphones and associated with the second zone 550. Such audio data can be processed locally by the computing component or remotely by an NLP component to determine the requested operation and can be compared to the second permission 552 to determine if the requested operation is permitted (e.g., when the audio data indicates a request to pause, this request can be denied. However, if the audio data indicates a request to queue and audio library, this request can be permitted).

In an example, when multiple zones are operated in a multiple zone mode 500, these zones may initially be associated with the same set of permissions. One of the zones may be designated as a primary zone. Based on input associated with the primary zone, the set of permissions associated with another zone can be changed. Referring to the illustration of FIG. 5, the first zone 510 may be the primary zone. The first zone 510 and the second zone 550 may be initially associated with the same set of permissions (e.g., the first zone permissions 512) allowing for, example, control over the content output in each zone 510 and 550 or in both zones 510 and 550. Input associated with the first zone 510 can be received to change the permissions of the second zone 520 (e.g., from the first permissions 512 to the second zone permissions 552), such that the controls of the second zone 550 can become more restricted (e.g., allowing the second zone to control the content output in the second zone 550 only, or allowing the second zone to browse and request a content output). For example, this input can be received via the graphical user interface of the first display 530 or as speech input detected by a set of microphones and associated with the first zone 510, and can indicate that the permissions allocated to the second zone 550 are to be locked out (e.g., no control over the content output is allowed). As such, the second zone 550 may no longer be associated with the same set of permissions and can be instead associated with the restricted set of permissions. Conversely, additional input associated with the first zone 510 can be received to change the permissions back to the initial set of permissions (e.g., to unlock the second zone 550 and allow it again control over the content output).

FIG. 6 illustrates an example of an individual zone mode 600, according to embodiments of the present disclosure. The individual zone mode 600 can be referred to as a personal mode or a solo mode. Generally, the individual zone mode 600 is an operational mode that applies to a single zone. This zone can be associated with relatively large set of permissions that control the audio output in the zone, but not in other zones. The zone can be associated with at least one speaker and one display. Audio can be output by the speaker. The display be used in multiple ways. In a first example way, the display is used to identify the audio that is being output by the speaker(s) of the zone. In a second example way, the display is used to provide GUI components configured according to the set of permissions associated with the zone.

In the illustration of FIG. 6, a first zone 610 is associated with a first display 630 and a first speaker 635. For example, configuration data can be stored (e.g., by a computing component) and can include a first zone identifier of the first zone 610, a first display identifier of the first display 630, and a first speaker identifier of the first speaker 635. The first zone 610 can also be associated with first zone permissions 612 based on a number of factors, such as the operational mode of this zone 610 being an individual zone mode 600 and/or a profile of a user of the first zone 610. For example, permission data can be stored (e.g., by the computing component) and can include the first zone identifier and permission identifiers (that can be mapped to permission descriptors that may be stored in a different data store) or the permission descriptors. The first zone 610 can also be associated with the individual zone mode 600. For example, operational data can be stored (e.g., by the computing component) and can include the first zone identifier and a mode identifier of the individual zone mode 600.

Similarly, a second zone 650 is associated with a second display 670 and a second speaker 675. For example, configuration data can be stored (e.g., by the computing component) and can include a second zone identifier of the second zone 650, a second display identifier of the second display 670, and a second speaker identifier of the second speaker 675. The second zone 650 can also be associated with second zone permissions 652 based on a number of factors, such as the operational mode of the second zone 650 also being an individual zone mode 600 and/or a profile of a user of the second zone 650. For example, permission data can be stored (e.g., by the computing component) and can include the second zone identifier and permission identifiers (that can be mapped to permission descriptors that may be stored in a different data store) or the permission descriptors. The second zone 650 can also be associated with the individual zone mode 600. For example, operational data can be stored (e.g., by the computing component) and can include the second zone identifier and the mode identifier of the multiple zone mode 600.

Given the operational data indicating that both zones are associated with the individual zone mode 600, the audio outputs in both zones can be independent of each other. For example, computing component can send first audio data to the first speaker 635 and second audio data that need correspond to the first audio data to the second speaker 675. In turn, the first speaker outputs first audio 637 and the second speaker outputs second audio 677 independently of each other.

Further, the computing component can send first metadata about the first audio data to the first display 630 and metadata about the second audio data to the second display 670. In turn, the first display 630 outputs a first GUI that shows an identifier 632 of the first audio 637 that is being output by the first speaker 635 and other data, such as audio content that is queued in an audio library. Similarly, the second display 670 outputs a second GUI that shows an identifier 672 of the second audio 677 that is being output by the second speaker 675 and other data, such as audio content that is queued in an audio library.

Given the first zone permissions 612, the computing component sends a command to the first display 630 to enable a control bar 634 that provides various content controls over the audio output in the first zone 610 only. In turn, the first display 630 includes a GUI control component in the first GUI showing the control bar 634 and including, for example, a play control, a pause control, a stop control, a fast forward control, a skip control, and the like. Upon a selection of any of such controls via the first GUI, the first display 630 sends the corresponding input data to the computing component that, in turn, processes this input data to determine an operation to be performed on the audio output in the first zone 610 (e.g., paly, pause, stop, fast forward, skip). Next, the computing component causes the operation to be performed in the first zone 610 only. For example, in the case of a pause operation, the computing component sends a first command to the first speaker 635 to pause the first audio output and a second command to the first display 630 to indicate the pausing.

Herein above, the input data is described as being received via the first GUI of the first display 630. Nonetheless, input data can be audio data generated by a set of microphones and associated with the first zone 610. Such audio data can be processed locally by the computing component or remotely by an NLP component to determine the requested operation.

Similarly, given the second zone permissions 652, the computing component sends a command to the second display 670 to enable a control bar 674 that provides various content controls over the audio output in the second zone 650 only. In turn, the second display 670 includes a GUI control component in the second GUI showing the control bar 674 and including, for example, a play control, a pause control, a stop control, a fast forward control, a skip control, and the like. Upon a selection of any of such controls via the second GUI, the second display 670 sends the corresponding input data to the computing component that, in turn, processes this input data to determine an operation to be performed on the audio output in the second zone 650 (e.g., paly, pause, stop, fast forward, skip). Next, the computing component causes the operation to be performed in the second zone 650 only. For example, in the case of a pause operation, the computing component sends a second command to the second speaker 675 to pause the second audio output and a second command to the second display 670 to indicate the pausing.

Herein above, the input data is described as being received via the second GUI of the second display 670. Nonetheless, input data can be audio data generated by a set of microphones and associated with the second zone 650. Such audio data can be processed locally by the computing component or remotely by an NLP component to determine the requested operation.

FIG. 7 illustrates an example of an output-only mode 700, according to embodiments of the present disclosure. The output-only mode 700 can be referred to as listen-only mode (e.g., in the case of audio output) or a view-only mode (e.g., in the case of a video output). Generally, the output-only mode 700 is an operational mode that applies to a particular zone. A first zone is designated as a primary zone that is associated with permissions over the audio output in the particular zone, whereas the particular zone can be designated as a secondary zone that may be associated with limited permission. Each zone can be associated with at least one speaker and one display. Audio can be output by a speaker in a secondary zone, but no audio output may be needed in the primary zone. A display in the secondary zone can be used in multiple ways. In a first example way, the display is used to identify the audio that is being output by the speaker(s) of the secondary zone. In a second example way, the display is used to provide GUI components configured according to the limited set of permissions, if any, associated with the secondary zone. A display in the first zone may present GUI control components associated with controlling the audio output in the secondary zone.

In the illustration of FIG. 7, a first zone 710 is associated with a first display 730 and a first speaker 735. For example, configuration data can be stored (e.g., by a computing component) and can include a first zone identifier of the first zone 710, a first display identifier of the first display 730, and a first speaker identifier of the first speaker 735. The first zone 710 can also be associated with first zone permissions 712 based on a number of factors, such as the operational mode being an output-only mode 700 (whereby the first zone 710 is designated as a primary zone) and/or a profile of a user of the first zone 710. For example, permission data can be stored (e.g., by the computing component) and can include the first zone identifier and permission identifiers (that can be mapped to permission descriptors that may be stored in a different data store) or the permission descriptors. The first zone 710 can also be associated with the output-only mode 700. For example, operational data can be stored (e.g., by the computing component) and can include the first zone identifier and a mode identifier of the output-only mode 700 and a primary zone designation.

Similarly, a second zone 750 is associated with a second display 770 and a second speaker 775. For example, configuration data can be stored (e.g., by the computing component) and can include a second zone identifier of the second zone 750, a second display identifier of the second display 770, and a second speaker identifier of the second speaker 775. The second zone 750 can also be associated with second zone permissions 752 based on a number of factors, such as the operational mode being an output-only mode 700 (whereby the second zone 750 is designated as a secondary zone) and/or a profile of a user of the second zone 750. For example, permission data can be stored (e.g., by the computing component) and can include the second zone identifier and permission identifiers (that can be mapped to permission descriptors that may be stored in a different data store) or the permission descriptors. The second zone 750 can also be associated with the output-only mode 700. For example, operational data can be stored (e.g., by the computing component) and can include the second zone identifier and the mode identifier of the output-only mode 700 and a secondary zone designation.

Given the operational data indicating that both zones are associated with the output-only mode 700, the computing component may send first audio data to the first speaker 735 and second audio data that may, but need not, correspond to the first audio data to the second speaker 775. In turn, the first speaker may output first audio 737 and the second speaker outputs second audio 777. If both audio outputs occur, they may, but need, occur in a time synchronized manner. Alternatively, the computing component can send first audio data to the first speaker 735 that then may present this first audio data as the first audio 737 and sends it forward to the second speaker 775 that outputs it as the second audio 777.

Further, the computing component may send first metadata about the first audio data to the first display 730 and metadata about the second audio data to the second display 770. In turn, the first display 730 may output a first GUI that shows an identifier 732 of the first audio 737 that is being output by the first speaker 735 and other data, such as audio content that is queued in an audio library. Similarly, the second display 770 outputs a second GUI that shows an identifier 772 of the second audio 777 that is being output by the second speaker 775 and, optionally, other data, such as audio content that is queued in an audio library. This type of data that is presented in the second GUI can be the same as the data described so far as being presented in the first GUI. Alternatively, the computing component may send first metadata to the first display that may it for driving the first GUI can forward it to the second display 770 for use threat in the second GUI.

Given the first zone permissions 712, the computing component sends a command to the first display 730 to enable a control bar 734 that provides various content controls over the audio outputs in both zones 710 and 750. In turn, the first display 730 includes a GUI control component in the first GUI showing the control bar 734 and including, for example, a play control, a pause control, a stop control, a fast forward control, a skip control, and the like. Upon a selection of any of such controls via the first GUI, the first display 730 sends the corresponding input data to the computing component that, in turn, processes this input data to determine an operation to be performed on the audio outputs (e.g., paly, pause, stop, fast forward, skip). Next, the computing component causes the operation to be performed in both zones 710 and 750. For example, in the case of a pause operation, the computing component sends a first command to the first speaker 735 to pause the first audio output, a second command to the second speaker 775 to pause the second audio output, a third command to the first display 730 to indicate the pausing, and fourth command to the second display 770 to also indicate the pausing.

Herein above, the input data is described as being received via the first GUI of the first display 730. Nonetheless, input data can be audio data generated by a set of microphones and associated with the first zone 710. Such audio data can be processed locally by the computing component or remotely by an NLP component to determine the requested operation.

Given the second zone permissions 752, the computing component sends a command to the second display 770 to disable any content controls via the second GUI (or to enable a limited set of content controls such as to browse the audio library but not to make any requests). Accordingly, the second display 770 lacks a GUI control component in the second GUI showing a control bar and/or may include a control bar showing the limited set of content controls.

Audio data generated by a set of microphones and associated with the second zone 750 can be received and can indicate a request for an operation not permitted in the second zone 750. Such audio data can be processed locally by the computing component or remotely by an NLP component to determine the requested operation and can be compared to the second permission 752 to determine whether the requested operation is permitted. If permitted, the infotainment can cause the second display 770 to present an indication of the permission in the second GUI and/or the second speaker 775 to indicate the permission (e.g., by mixing a TTS message indicating the permission with the second audio 777 that is being output by the second speaker 775). If denied, the computing component can cause the second display 770 to present an indication of the denial in the second GUI and/or the second speaker 775 to indicate the denial (e.g., by mixing a TTS message indicating the denial with the second audio 777 that is being output by the second speaker 775). Additionally or alternatively, in the case of a denial, the computing component can cause the first display 730 and/or the first speaker 735 to present an indication of the requested operation. Input data associated with the first zone and received via the first GUI or as audio data associated with the first zone can be further processed to determine if an approval is received for performing the operation. If approved, the computing component causes the operation to be executed and the second display 770 and/or the second speaker 775 to present an indication of the approval. Otherwise, the execution of the operation is forgone, and the indication of the denial is presented in the second GUI and/or by the second speaker 775.

Figure 8:
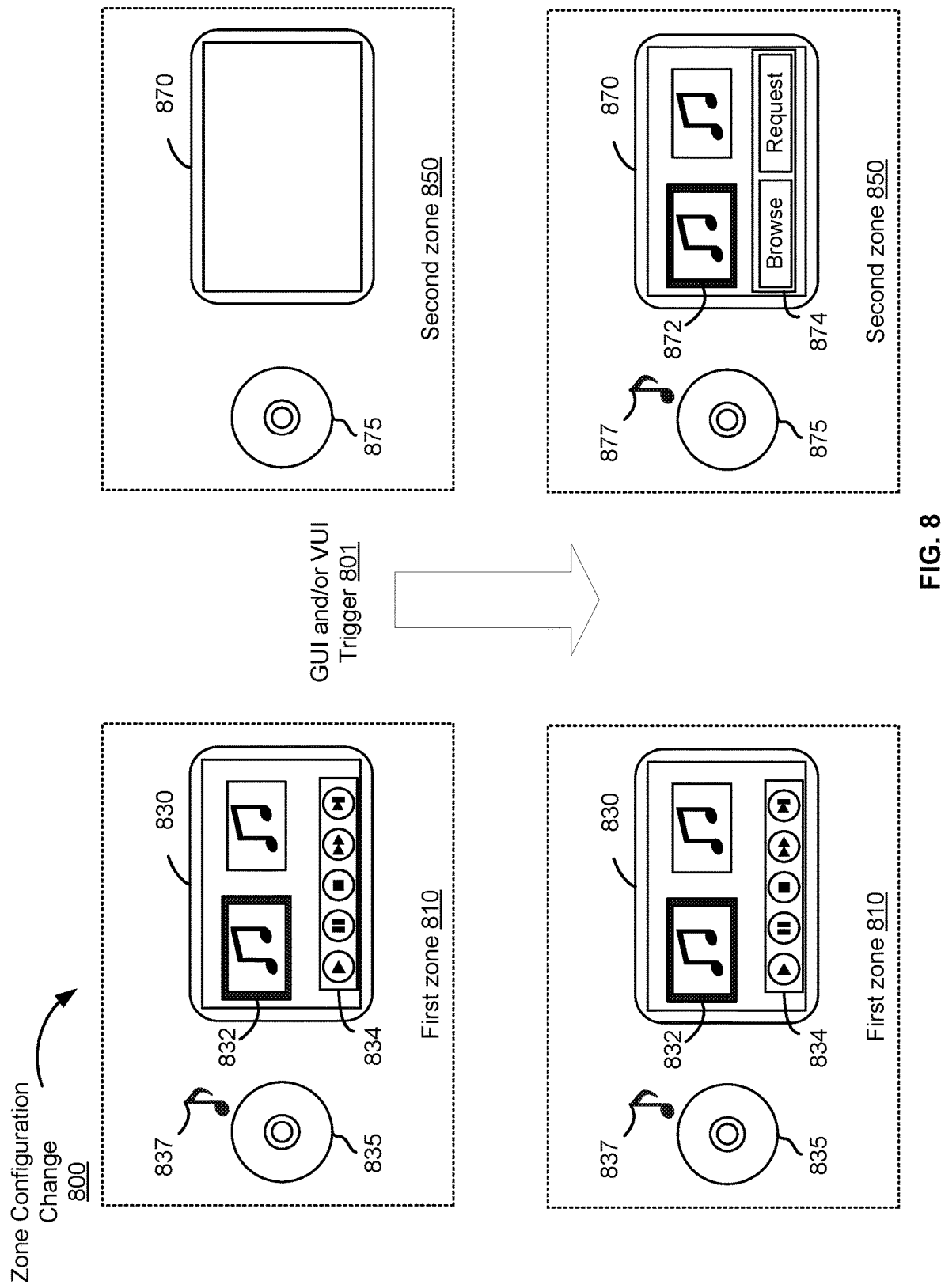
FIG. 8 illustrates an example of a zone configuration change, according to embodiments of the present disclosure.

FIG. 8 illustrates an example of a zone configuration change 800, according to embodiments of the present disclosure. As illustrated a first zone 810 is associated with a first display 830 and a first speaker 810, whereas a second zone 850 is associated with a second display 850 and a second speaker 875. A GUI and/or voice user interface (VUI) trigger 801 can be processed to determine a request to add the second zone 850 to the first zone 810 such that these two zones 810 can be operated in a multi-zone configuration.

As illustrated, prior to the GUI and/or VUI trigger 801, the first zone 810 may be associated with an individual zone mode or even a multiple zone mode shared with a third zone (in which the first zone 810 may be a primary zone). Accordingly, the first speaker 835 is outputting first audio 837 corresponding to first audio data. The first display 830 is also presenting a first GUI that includes an identifier 832 of the first audio data and a control bar 834. Alternatively, the first zone 810 may not be associated with any operational mode and, and such, no audio and related controls can be output by the first speaker 835 and the first display 830.

Also as illustrated in FIG. 8, prior to the GUI and/or VUI trigger 801, the second zone 850 may not be associated with any operational mode and, as such, no audio and related controls can be output by the second speaker 875 and the second display 870. Alternatively, the second zone 850 may be associated with an individual zone mode or even a multiple zone mode shared with a fourth zone. In this case, audio output and related controls can be occurring in the second zone 850.

After the GUI and/or VUI trigger 801 is received and processed, the two zones 810 and 850 are configured as a shared zone associated with a multiple zone configuration. Here, the configuration data and/or the operational data are updated to indicate the multiple zone configuration. For example, a first zone identifier of the first zone 810 is associated with a mode identifier of the multiple zone configuration and a primary zone designation, whereas a second zone identifier of the second zone 850 is associated with the mode identifier of the multiple zone configuration and a secondary zone designation. Additionally or alternatively, a zone identifier is used for the shared zone and is associated with a first speaker identifier of the first speaker 835, a first display identifier of the first display 830, a second speaker identifier of the second speaker 875, and a second display identifier of the second display 870. Further, in this example, the first speaker identifier and the first display identifier can be associated with the primary zone designation, whereas the second speaker identifier and the second display identifier can be associated with the secondary zone identifier. Permission data can also be updated to indicate the set of permissions associated with the first zone 810 and the second zone 850 given that the first zone 810 is designated as a primary zone and the second zone 850 is designated as a secondary zone.

As such, when audio and related controls occur in the first zone 810, corresponding audio and related controls occur in the second zone 850, in a manner similar to the description herein above of FIG. 5. In the illustration of FIG. 8, the second speaker 875 outputs second audio 837 corresponding to the first audio data. The second display 870 also presents a second GUI that includes an identifier 872 of the first audio data and a control bar 874 having a limited set of functions relative to the control bar 834 of the first GUI.

In an example, the GUI and/or VUI trigger 801 can correspond to input data associated with a zone. For example, the input data can be received via a GUI presented on a display included in the zone. In this case, given permissions associated with the zone, the GUI can present a GUI request component associated with requesting the addition of the second zone 850 to the first zone 810. This GUI can be presented, for instance, on the first display 830 and/or the second display 870. In another example, the input data can be audio data generated by a set of microphones and associated with a zone identifier of the zone. This audio data can be processed locally by the computing component or remotely by an NLP component and a permissions processing component to determine the requested addition and whether such addition is permitted or not.

Figure 9:
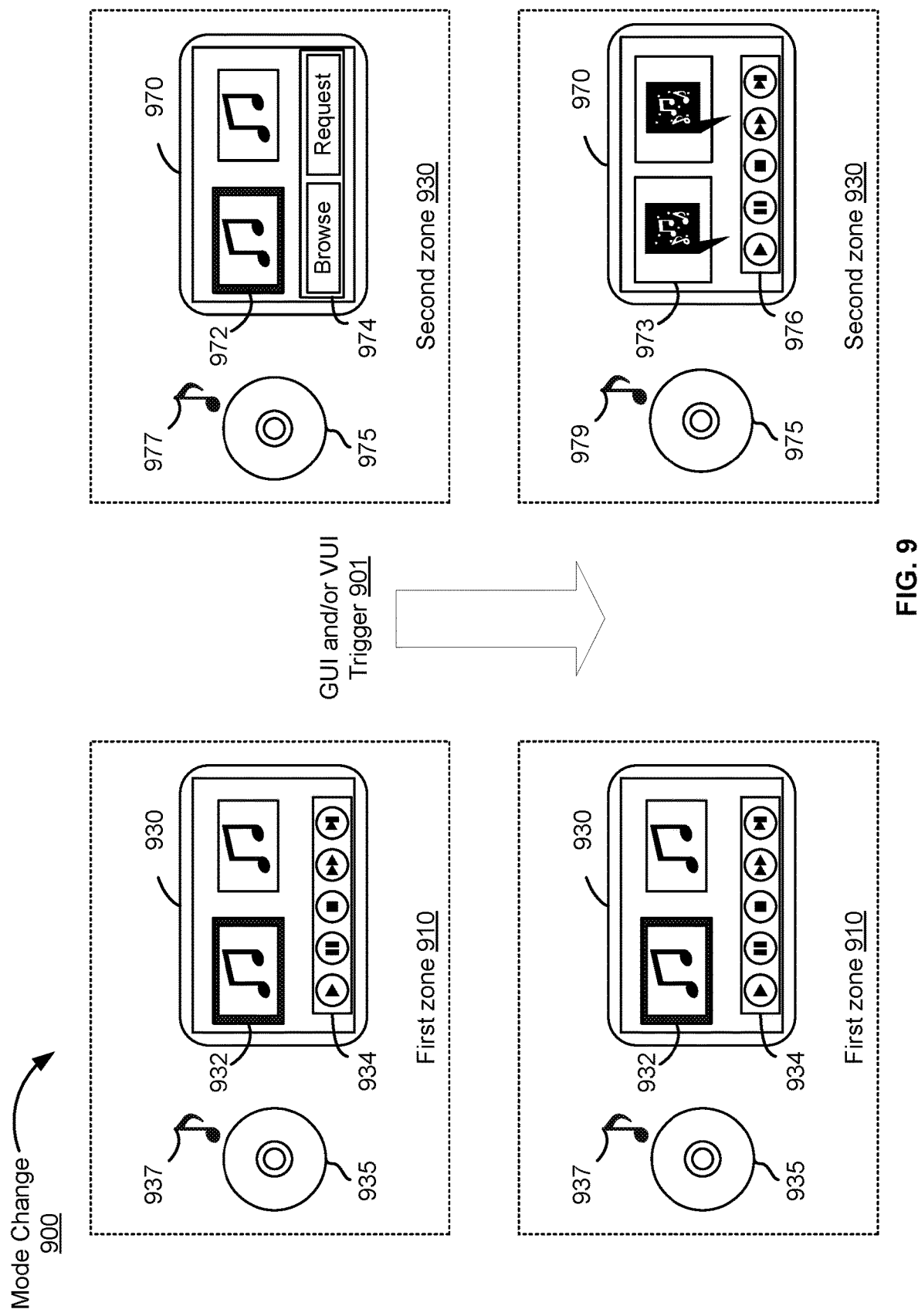
FIG. 9 illustrates an example of a mode change, according to embodiments of the present disclosure.

FIG. 9 illustrates an example of a mode change 900, according to embodiments of the present disclosure. As illustrated a first zone 910 is associated with a first display 930 and a first speaker 910, whereas a second zone 950 is associated with a second display 950 and a second speaker 975. A GUI and/or VUI trigger 901 can be processed to determine a request to change an operational mode from a first operational mode to a second operational mode. In the illustration of FIG. 9, this change is shown as switching from a multiple zone mode to individual zone modes.

As illustrated, prior to the GUI and/or VUI trigger 901, the first zone 910 and the second zone 950 may be associated with a multiple zone mode. Accordingly, the first speaker 935 is outputting first audio 937 corresponding to first audio data. The first display 930 is also presenting a first GUI that includes an identifier 932 of the first audio data and a control bar 934. Similarly, the second speaker 975 is outputting second audio 977 that also corresponds to the first audio data. The first display 970 is also presenting a second GUI that includes an identifier 972 of the first audio data and a control bar 974 with relatively a smaller set of functions than the first control bar 934.

After the GUI and/or VUI trigger 901 is received and processed, each of the two zones 910 and 950 is re-associated with an individual zone mode. Here, the operational data and/or the configuration data are updated to indicate the individual zone modes. For example, each of a first zone identifier of the first zone 910 and a second zone identifier of the second zone 950 is associated with a mode identifier of an individual zone configuration. Additionally or alternatively, a first speaker identifier of the first speaker 935 and a first display identifier of the first display 930 are associated with the mode identifier and, separately, a second speaker identifier of the second speaker 975 and a second display identifier of the second display 970 are also associated with the mode identifier. Permission data can also be updated to indicate the set of permissions associated with the first zone 910 and the second zone 950 given that each of these two zones 910 and 950 are to be operated in the individual zone mode.

As such, after the GUI and/or VUI trigger 901 is received and processed, the first audio 977 and related controls can continue to be presented in the first zone 950 (e.g., in the case, where the first zone 950 was designated as the primary zone or in the case if the GUI and/or VUI trigger 901 corresponds to input data associated with first zone 850). In comparison, the second speaker 975 can present third audio 979 that does not correspond to the first audio data. The second display 970 can also present a third GUI that includes an identifier 973 that corresponds to the third audio 979 and a control bar 976 that provides similar controls as the control bar 934.

In an example, the GUI and/or VUI trigger 901 can correspond to input data associated with a zone. For example, the input data can be received via a GUI presented on a display included in the zone. In this case, given permissions associated with the zone, the GUI can present a GUI request component associated with requesting the change to the current operational mode. This GUI can be presented, for instance, on the first display 930 and/or the second display 970. In another example, the input data can be audio data generated by a set of microphones and associated with a zone identifier of the zone. This audio data can be processed locally by the computing component or remotely by an NLP component and a permissions processing component to determine the requested change and whether such a change is permitted or not.

Figure 10:
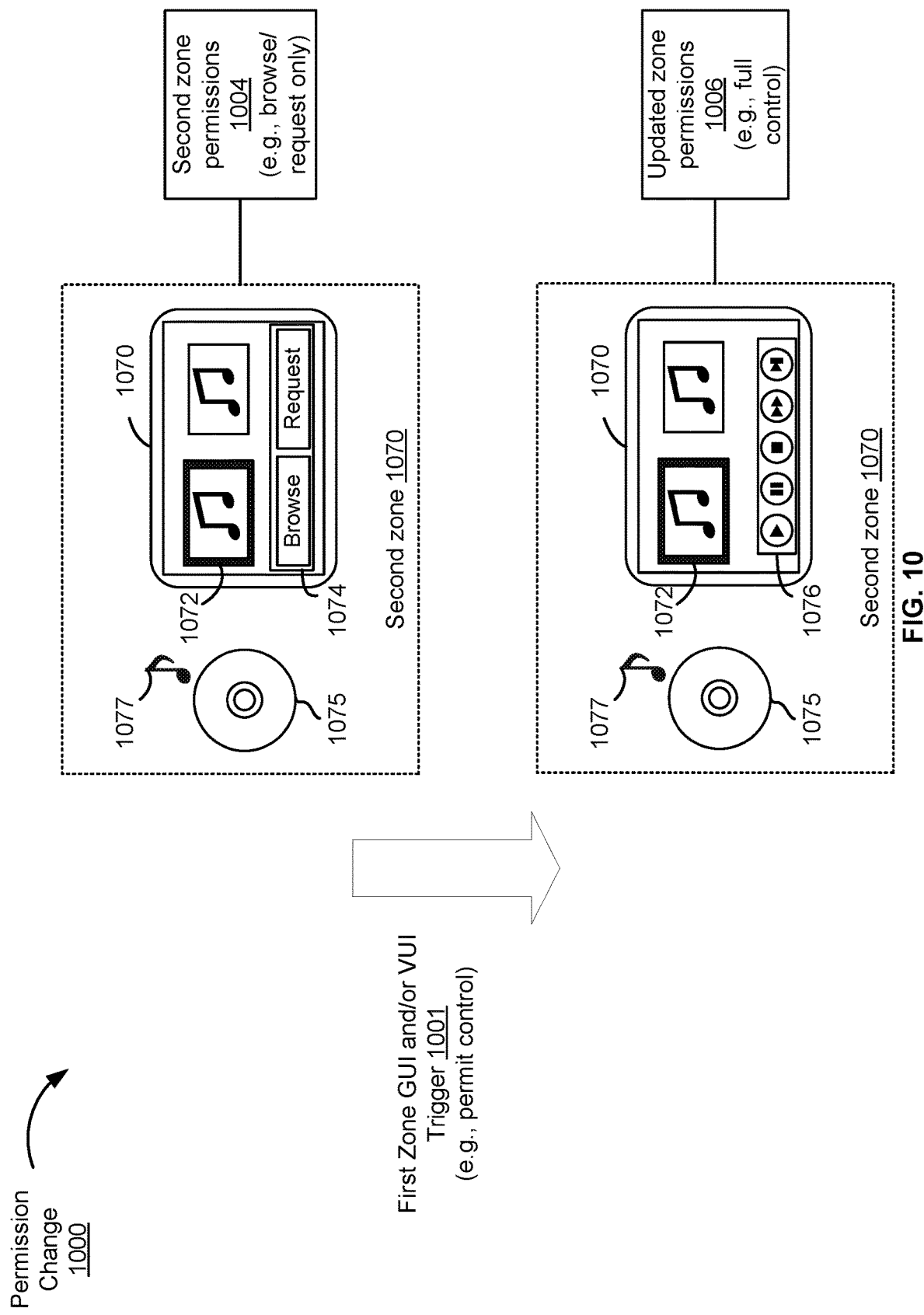
FIG. 10 illustrates an example of a permission change associated with a zone of multiple zones, according to embodiments of the present disclosure.

FIG. 10 illustrates an example of a permission change 1000 associated with a zone of multiple zones, according to embodiments of the present disclosure. In an example, a first zone (not illustrated) can be associated with a first set of permissions that enables the permission change 1000 for a second zone 1050, when this permission change 1000 originates from the first zone. Prior to the permission change 1000, the second zone 1050 is associated with second zone permissions 1004. After the permission change 1000, the second zone 1050 is associated with updated zone permission 1006.

In the illustration of FIG. 10, the second zone permissions 1004 may be limited to audio browsing and/or requesting functionalities. The updated zone permissions 1006 may be full audio control permissions (e.g., play, pause, stop, fast forward, skip, etc.). Generally, the permission change 1000 can increase the scope, or conversely, limit the scope of the permissions associated with the second zone 1050.

According to the illustration of FIG. 10, the second zone 1050 is associated with a display 1070 and a speaker 1075. Prior to a GUI and/or VUI trigger 1001 that originates from the first zone, the speaker 1075 is outputting first audio 1077, whereas the display 1070 is outputting a GUI that includes an identifier 1072 of the first audio 1077 and a control bar 1074 that includes the browse component and the request component. After the GUI and/or VUI trigger 1001 is received and processed, the speaker 1075 may continue outputting the first audio 1077, whereas the display 1070 updates the GUI to show a different control bar 1076 that includes the content control components (e.g., a play option, a pause option, a stop option, a fast forward option, a skip option, etc.).

In an example, the GUI and/or VUI trigger 1001 can correspond to input data associated with the first zone. For example, the input data can be received via a GUI presented on a display included in the first zone. In this case, given the first set permissions associated with the first zone, the GUI can present a GUI permission component associated with changing the permissions associated with a different zone. change to the current operational mode. In another example, the input data can be audio data generated by a set of microphones and associated with a zone identifier of the first zone. This audio data can be processed locally by the computing component or remotely by an NLP component and a permissions processing component to determine the requested permission change 1000 and whether such a permission change 1000 is approved or not.

Figure 11:
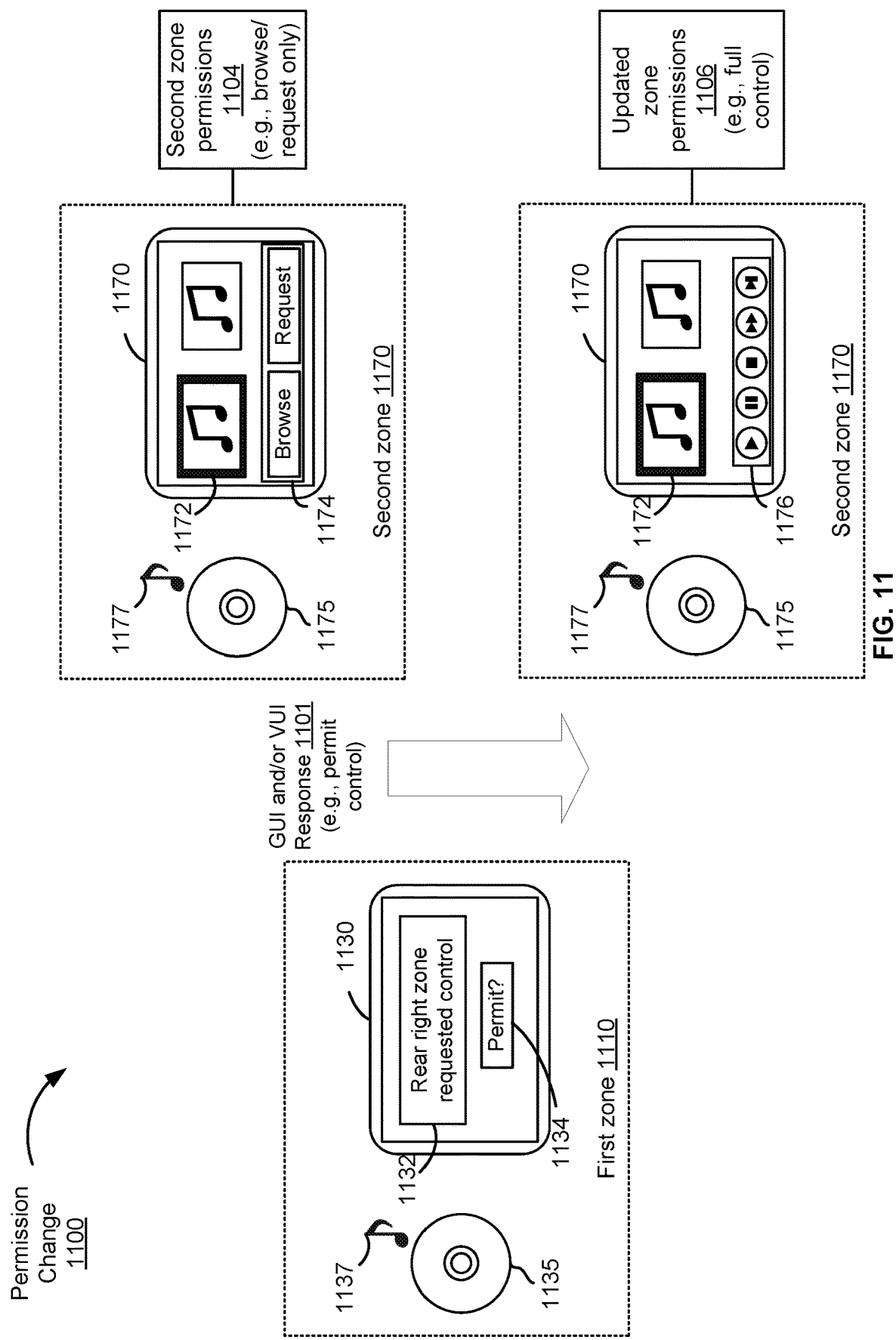
FIG. 11 illustrates another example of a permission change associated with a zone of multiple zones, according to embodiments of the present disclosure.

FIG. 11 illustrates another example of a permission change 1100 associated with a zone of multiple zones, according to embodiments of the present disclosure. In an example, a first zone 1110 can be associated with a first set of permissions that enables the permission change 1100 for a second zone 1150, when this permission change 1100 originates from the second zone 1050 (rather than the first zone 1110 as in the illustration of FIG. 10). Prior to the permission change 1100, the second zone 1150 is associated with second zone permissions 1104. After the permission change 1100, the second zone 1150 is associated with updated zone permission 1106.

In the illustration of FIG. 11, the second zone permissions 1104 may be limited to audio browsing and/or requesting functionalities. The updated zone permissions 1106 may be full audio control permissions (e.g., play, pause, stop, fast forward, skip, etc.). Generally, the permission change 1100 can increase the scope, or conversely, limit the scope of the permissions associated with the second zone 1150.

According to the illustration of FIG. 11, the second zone 1150 is associated with a second display 1170 and a second speaker 1175. Prior to a GUI and/or VUI trigger that originates from the second zone, the second speaker 1175 is outputting first audio 1177, whereas the second display 1170 is outputting a second GUI that includes an identifier 1172 of the first audio 1177 and a control bar 1174 that includes the browse component and the request component. The GUI and/or VUI trigger can correspond to input data received via the second GUI and/or generated by a set of microphones and associated with a zone identifier of the second zone 1150. In both cases, the input data can indicate that the permission change 1100 is requested.

This input data can be received and processed by a computing component that determines that the second zone permissions 1104 do not permit the requested permission change 1100. The computing component can look up permissions of remaining zones (or of a zone designated as a primary zone) and determines that the first set of permissions associated with the first zone 1110 may allow the requested permission change 1100. The computing component sends data to a first display 1030 associated with the zone indicating a request for the permission change 1100 and a command to present this request 1132 in a first GUI on the first display 1070 along with a permission component 1134 in the first GUI, where this permission component 1134 can be interacted with to allow or deny the requested permission change 1100. Additionally or alternatively, the computing component sends a TTS message to a first speaker 1035 associated with the zone indicating a request for the permission change 1100 and a command to present this TTS message as an audio output 1137.

In turn, a GUI and/or a VUI response 1101 is received and processed by the infotainment system. This response 1101 can correspond to input data that originates from the first zone 1110. The input data can correspond to an input received via the first GUI of the first display 1130 (e.g., as interaction data corresponding to an interaction with the permission component 1134). Additionally or alternatively, the input data can be audio data generated by a set of microphones and associated with a zone identifier of the first zone 1110. In both cases, the computing component can locally process the input data and/or this processing can be distributed to include an NLP component and/or a permissions processing component of a set of computers. The processing can indicate whether the requested permission change 1110 is approved or denied. If approved, the second zone permissions 1104 (e.g., the corresponding permission data) are updated to then become the updated zone permission 1106. In addition, the computing component can cause the second display to present in the GUI and/or the second speaker to output an indication of the approval. If denied, the second zone permissions 1104 (e.g., the corresponding permission data) are not updated. In addition, the computing component can cause the second display to present in the GUI and/or the second speaker to output an indication of the denial.

According to the illustration of FIG. 11, the requested permission change 1100 is approved. In this use case, after the GUI and/or VUI response 1101 is received and processed, the second speaker 1175 may continue outputting the first audio 1177, whereas the second display 1170 updates the second GUI to show a different control bar 1176 that includes the content control components (e.g., a play option, a pause option, a stop option, a fast forward option, a skip option, etc.).

FIGS. 12-15 illustrate example flows for outputting content in multiple zones. Operations of the flows can be performed by a computing component, such as the computing component described in connection with FIGS. 1-3. Some or all of the instructions for performing the operations can be implemented as hardware circuitry and/or stored as computer-readable instructions on a non-transitory computer-readable medium of the computing component. As implemented, the instructions represent software components that include circuitry or code executable by processor(s) of the computing component. The use of such instructions configures the computing component to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered.

Figure 12:
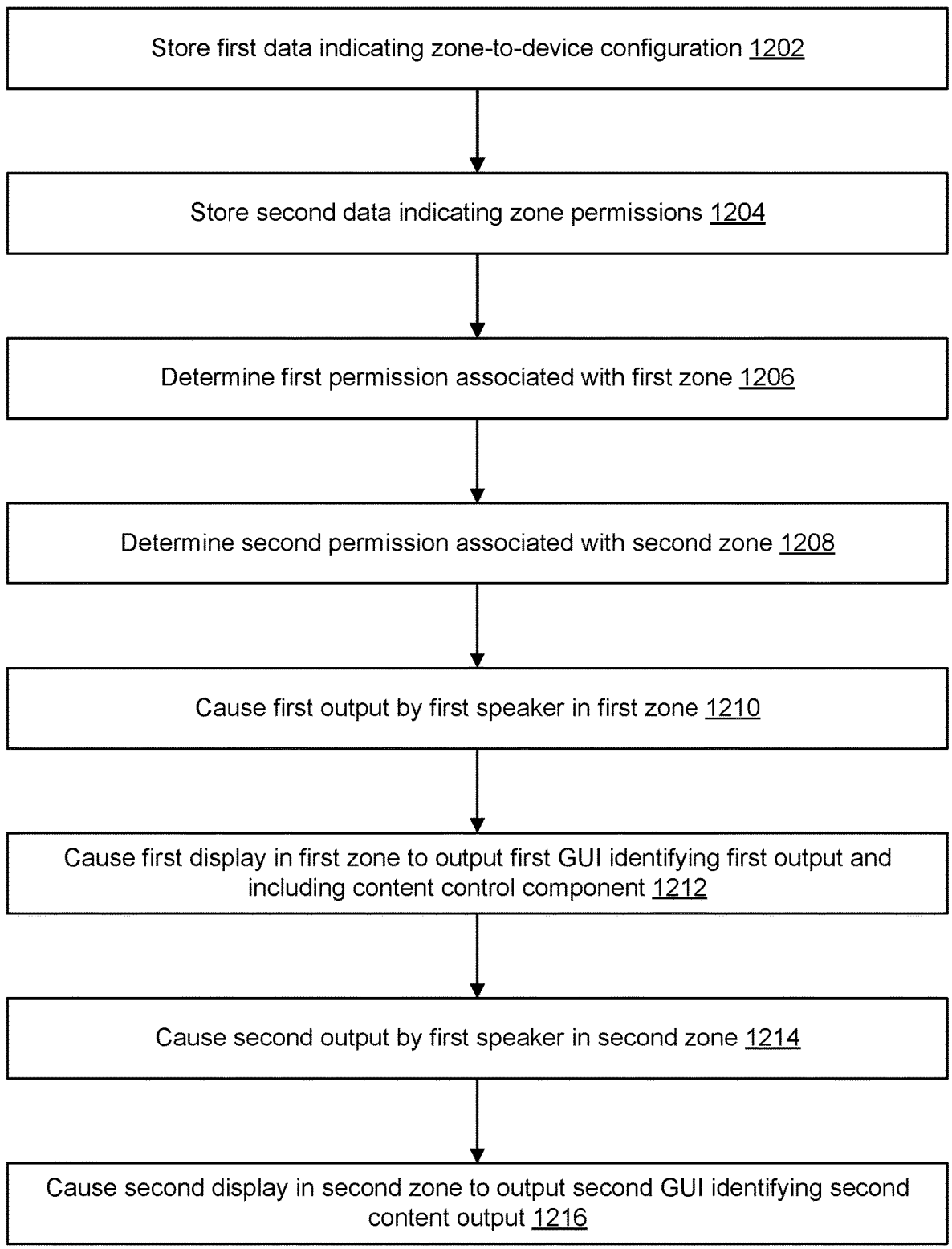
FIG. 12 illustrates an example of a flow for outputting content in multiple zones, according to embodiments of the present disclosure.

FIG. 12 illustrates an example of a flow for outputting content in multiple zones, according to embodiments of the present disclosure. As illustrated, the flow may start at operation 1202, where the computing component stores first data indicating zone-to-device configuration. For example, the first data includes configuration data as described herein above. In the use case of two zones, the first data can associate a first zone identifier of the first zone with a first speaker identifier of a first speaker in the first zone and a first display identifier of a first display in the first zone. The first data can also associate a second zone identifier of the second zone with a second speaker identifier of a second speaker in the second zone and a second display identifier of a second display in the second zone.

The flow may also include operation 1204, where the computing component stores second data indicating zone permissions. For example, the second data includes permission data as described herein above. In the use case of two zones, the second data associates the first zone identifier with a first permission and the second zone identifier with a second permission. The second permission can be different from the first permission depending on a number of factors, such as the operational modes of the first zone and the second zone. Assuming a difference, the first permission can enable identifying audio content in the first zone and controlling the audio content in the first zone and the second zone. In comparison, the second permission enabling identifying the audio content in the second zone and not controlling the audio content in the first zone or the second zone. Not controlling the audio content in the first zone or the second zone corresponds to the second zone prohibiting any controls over the audio content (e.g., the zone identifier of the second zone being unassociated with any controls over the audio content and being associated with only a permission to identify the audio content that is being output by one or more devices associated with the zone identifier.)

The flow may also include operation 1206, where the computing component determines the first permission associated with the first zone. For example, the first zone identifier is used in a look-up of the second data. This look-up can be performed upon input data received from the first display, the second display, or a set of microphones indicating a request for content output in the first zone.

The flow may also include operation 1208, where the computing component determines the second permission associated with the first zone. For example, the second zone identifier is used in a look-up of the second data. This look-up can be performed upon the same input data indicating that the request is for content output also in the second zone or based different input data received from the first display, the second display, or a set of microphones indicating a request for content output in the second zone.

The flow may also include operation 1210, where the computing component causes a first output by the first speaker in the first zone. For example, the computing component determines that the first speaker is associated with the first zone based on the first data and send audio data to the first speaker and a command to output such audio data.

The flow may also include operation 1212, where the computing component causes the first display in the first zone to output a first GUI that identifies the first output and includes a content control component. For example, the computing component sends metadata about the first output and a command to output this metadata and the content control component to the first display. The content control component can be based on the first permission indicating that controlling the content output is enabled.

The flow may also include operation 1214, where the computing component causes a second output by the second speaker in the second zone. For example, the computing component determines that the second speaker is associated with the first zone based on the first data and send audio data to the second speaker and a command to output such audio data The flow may also include operation 1216, where the computing component causes the second display in the second zone to output a second GUI that identifies the second output. For example, the computing component sends metadata about the second output and a command to output this metadata to the second display. Here, because the second permission does not enable controlling the content output, the computing component does not cause the second display to present the content control component. As such, the second GUI lacks such a component. Instead, and depending on the second permission, the computing component can cause the second GUI to include other components (e.g., a browse component, a request component, etc.).

Figure 13:
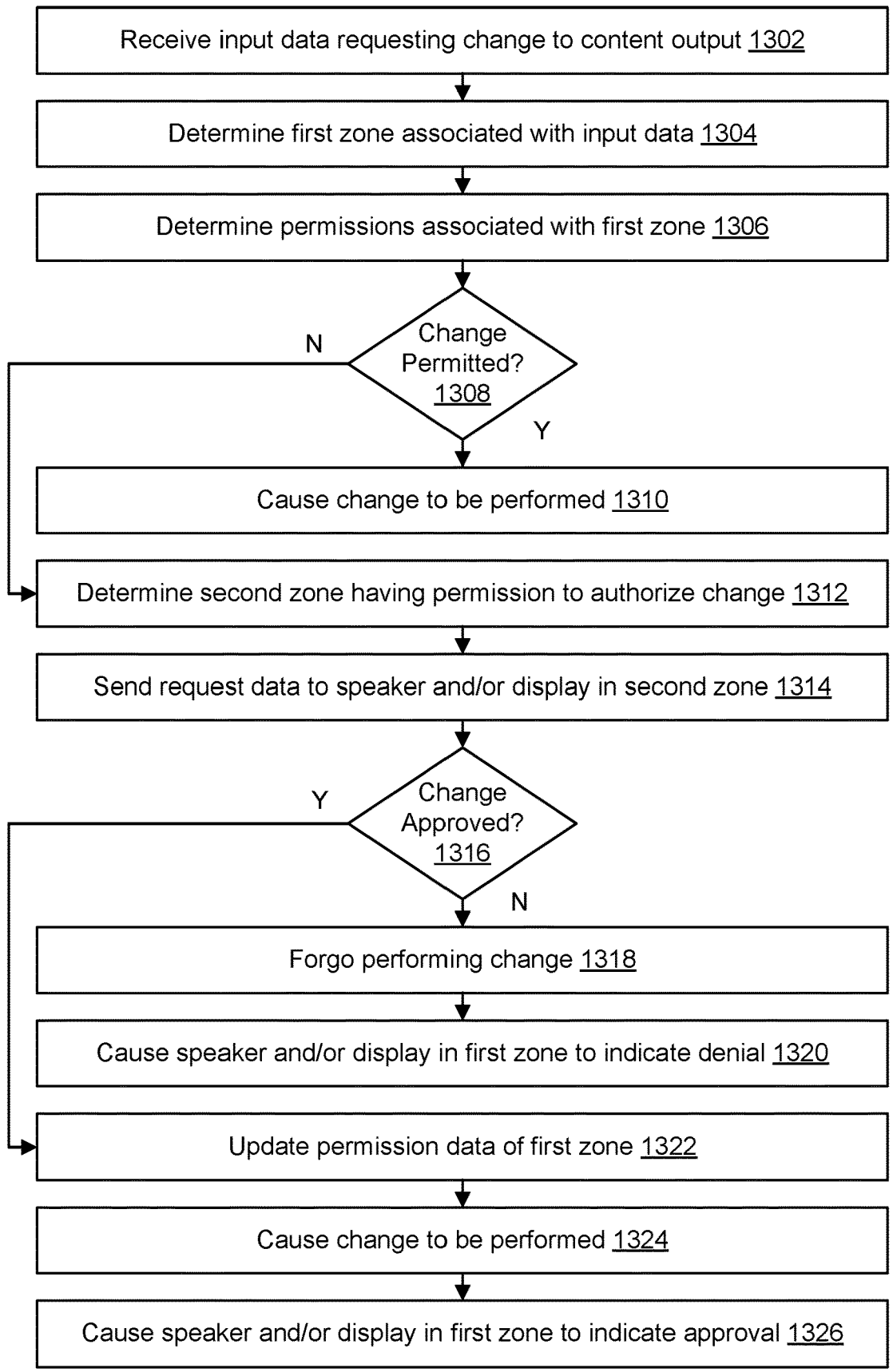
FIG. 13 illustrates an example of a flow for changing content output in multiple zones, according to embodiments of the present disclosure.

FIG. 13 illustrates an example of a flow for changing content output in multiple zones, according to embodiments of the present disclosure. As illustrated, the flow may start at operation 1302, where the computing component receives input data requesting a change to content output. For example, the input data is received from a display associated with a first zone and/or includes audio data generated by a set of microphones and associated with the first zone. The input data can indicate that the change is to be performed in the first zone and/or a different zone (e.g., to change the content output in multiple zones or in one particular zone).

The flow may also include operation 1304, where the computing component determines the first zone associated with the input data. For example, in the case of the input data is received from the display, the input data can include a display identifier that is then used in a look-up of configuration data to determine the zone identifier of the first zone. If the input data includes audio data, the input data can indicate the zone identifier.

The flow may also include operation 1306, where the computing component determines permissions associated with the first zone. For example, the zone identifier is used in a look-up of permission data.

The flow may also include operation 1308, where the computing component determines whether the change is permitted based on the permission data. For example, the permission data can indicate that changing the content output is enabled for the first zone. In this case, a positive determination is made and operation 1310 follows operation 1308. Otherwise, operation 1312 follows operation 1308.

The flow may also include operation 1310, where the computing component causes the change to be performed. For example, the computing component sends the relevant content data and command(s) to the relevant zone(s) in which the change is to be performed and causes devices (e.g., speaker(s) and/or display(s)) to output such data.

The flow may also include operation 1312, where the computing component determines a second zone having a permission to authorize the change. Here, the first zone lacks the permission for the change. Instead, the computing component looks up the permission data to determine which of the zones is associated with a permission that enables controlling the change. The result of the look-up includes a second zone identifier of the second zone.

The flow may also include operation 1314, where the computing component sends request data to a speaker and/or display associated with the second zone. For example, the configuration data is looked up to determine the speaker identifier and/or display identifier associated with the second zone. The request data is sent accordingly along with a presentation command and can indicate a request to approve the change.

The flow may also include operation 1316, where the computing component determines whether the change is approved. For example, input data is received from the display in the second zone or from a set of microphones indicating that the input data is associated with the second zone. This input data can indicate an approval or a denial of the request. If approved, operation 1322 follows operation 1316. Otherwise, operation 1318 follows operation 1316.

The flow may also include operation 1318, where the computing component forgoes performing the change. For example, the request is denied and no change to the content output is caused.

The flow may also include operation 1320, where the computing component causes the speaker and/or the display in the first zone to indicate the denial. For example, data indicating the denial is sent to any of such components along with a presentation command.

The flow may also include operation 1322, where the computing component updates the permission data of the first zone. Here, the change is permitted. Accordingly, the permission data associated with the zone identifier of the zone is updated to indicate that changing content output is enabled for the first zone.

The flow may also include operation 1324, where the computing component causes the change to be performed. For example, the change is to output different audio. The computing component send the relevant audio data along with a presentation command to the relevant devices.

The flow may also include operation 1326, where the computing component causes the speaker and/or the display in the first zone to indicate the approval. For example, data indicating the approval is sent to any of such components along with a presentation command.

Figure 14:
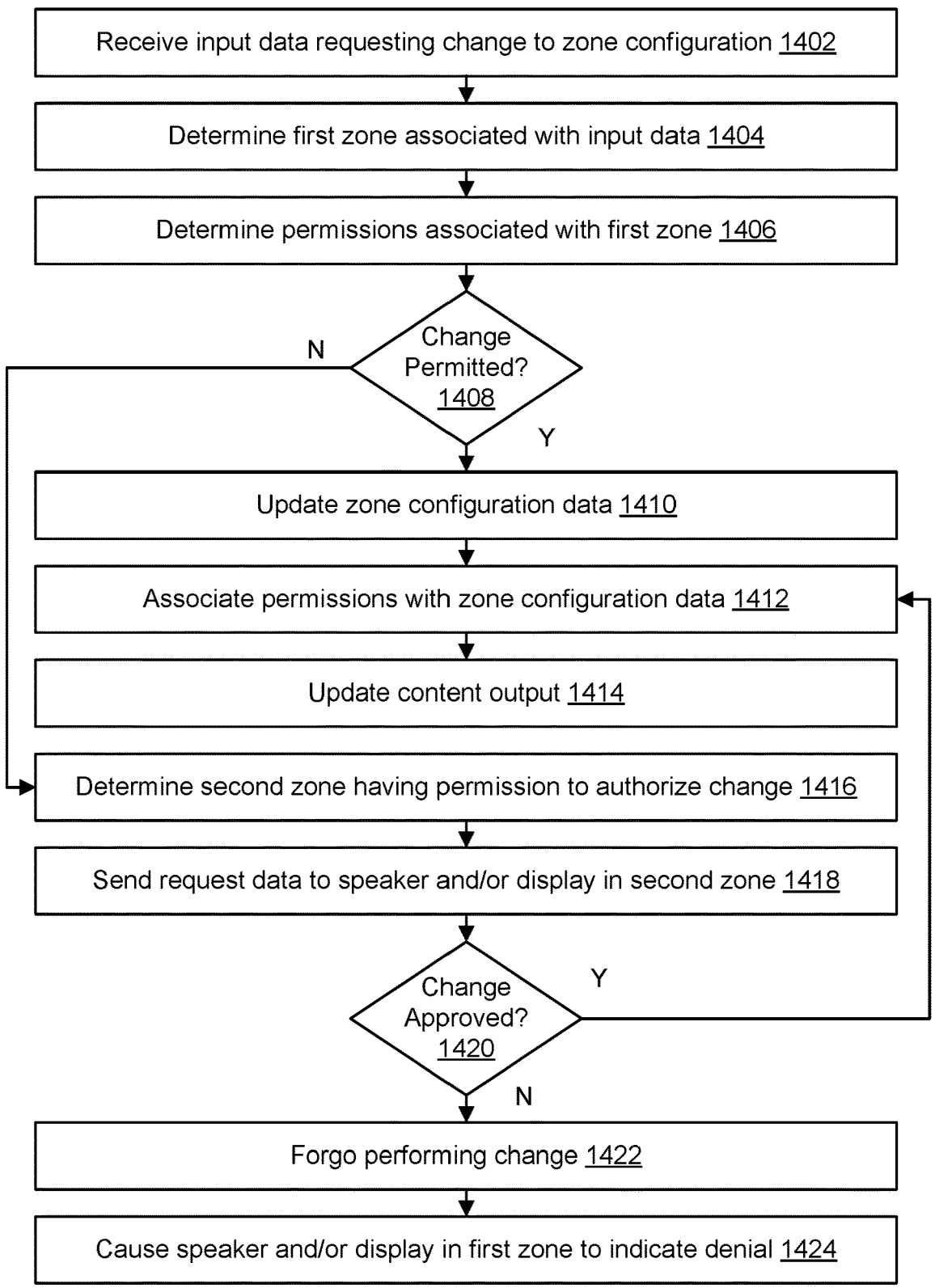
FIG. 14 illustrates an example of a flow for changing a zone configuration, according to embodiments of the present disclosure.

FIG. 14 illustrates an example of a flow for changing a zone configuration, according to embodiments of the present disclosure. As illustrated, the flow may start at operation 1402, where the computing component receives input data requesting a change to a zone configuration. For example, the input data is received from a display associated with a first zone and/or includes audio data generated by a set of microphones and associated with the first zone. The input data can indicate that the change is to be performed where multiple zones can be combined, a zone can be divided into multiple zones, and/or an endpoint (e.g., speaker and/or display) is to be added to a zone.

The flow may also include operation 1404, where the computing component determines the first zone associated with the input data. For example, in the case of the input data is received from the display, the input data can include a display identifier that is then used in a look-up of configuration data to determine the zone identifier of the first zone. If the input data includes audio data, the input data can indicate the zone identifier.

The flow may also include operation 1406, where the computing component determines permissions associated with the first zone. For example, the zone identifier is used in a look-up of permission data.

The flow may also include operation 1408, where the computing component determines whether the change is permitted based on the permission data. For example, the permission data can indicate that changing the content configuration is enabled for the first zone. In this case, a positive determination is made and operation 1410 follows operation 1408. Otherwise, operation 1416 follows operation 1408.

The flow may also include operation 1410, where the computing component updates the zone configuration data. For example, association between zone identifiers and device identifiers are updated to reflect the change.

The flow may also include operation 1412, where the computing component associates permission with the zone configuration data. For example, in the case of combining multiple zones to support a multiple zone operation, one zone can be designated as primary and can be associated with a first set of permissions, whereas other zones can be designated as secondary and associated with a more limited set of permissions. Conversely, if two currently combined zones are broken into individual zones, each of such zones can be associated with the first set of permissions.

The flow may also include operation 1414, where the computer system components update the content output based on the updated permissions. For example, a command can be sent to a display in a zone to show particular control components depending on the permissions set for that zone.

The flow may also include operation 1416, where the computing component determines a second zone having a permission to authorize the change. Here, the first zone lacks the permission for the change. Instead, the computing component looks up the permission data to determine which of the zones is associated with a permission that enables controlling the change. The result of the look-up includes a second zone identifier of the second zone.

The flow may also include operation 1418, where the computing component sends request data to a speaker and/or display associated with the second zone. For example, the configuration data is looked up to determine the speaker identifier and/or display identifier associated with the second zone. The request data is sent accordingly along with a presentation command and can indicate a request to approve the change.

The flow may also include operation 1420, where the computing component determines whether the change is approved. For example, input data is received from the display in the second zone or from a set of microphones indicating that the input data is associated with the second zone. This input data can indicate an approval or a denial of the request. If approved, operation 1412 follows operation 1420. Otherwise, operation 1422 follows operation 1420.

The flow may also include operation 1422, where the computing component forgoes performing the change. For example, the request is denied and no change to configuration data is made.

The flow may also include operation 1424, where the computing component causes the speaker and/or the display in the first zone to indicate the denial. For example, data indicating the denial is sent to any of such components along with a presentation command.

Figure 15:
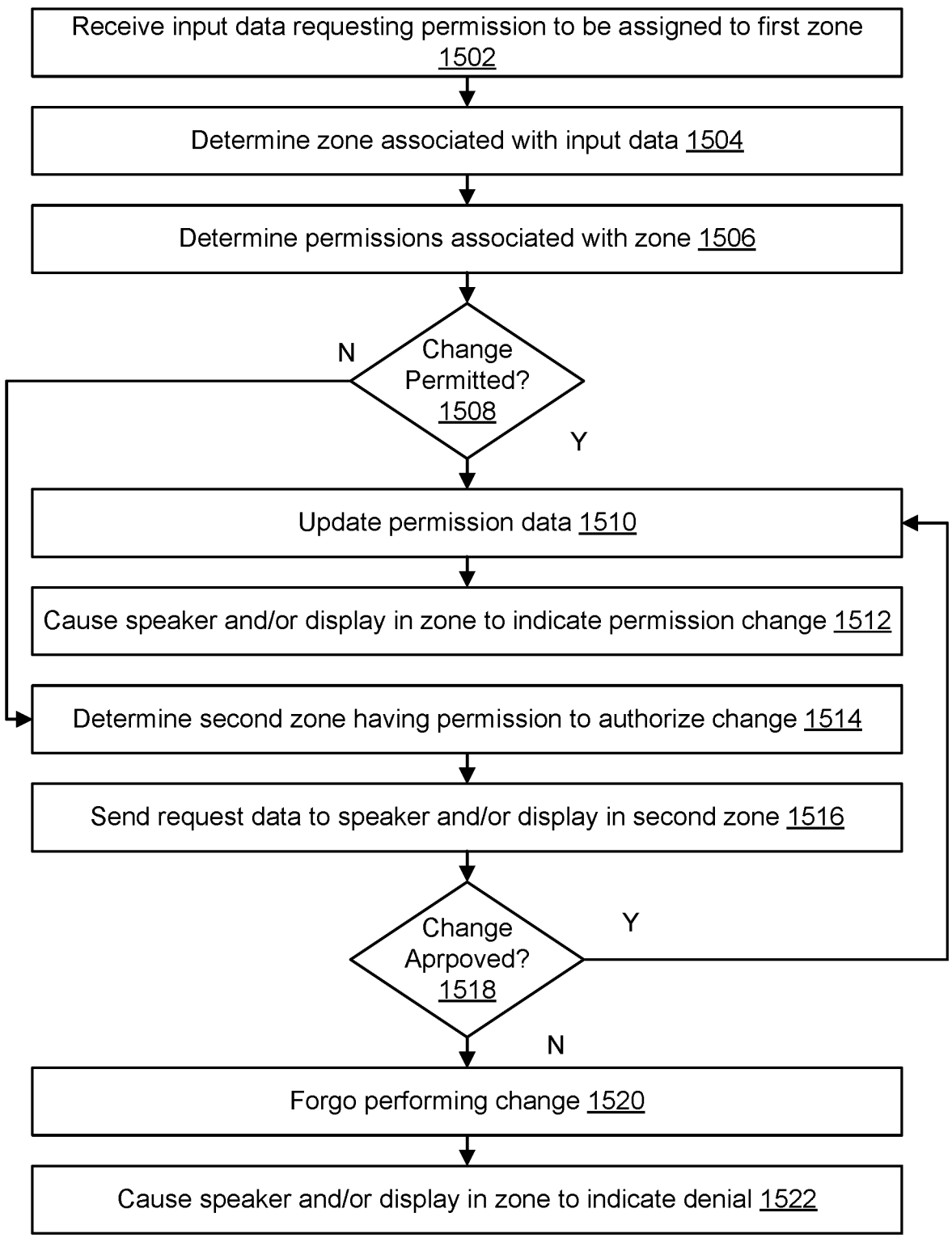
FIG. 15 illustrates an example of a flow for changing permissions associated with a zone, according to embodiments of the present disclosure.

FIG. 15 illustrates an example of a flow for changing permissions associated with a zone, according to embodiments of the present disclosure. As illustrated, the flow may start at operation 1502, where the computing component receives input data requesting a permission to be assigned to a first zone. For example, the input data is received from a display associated with a zone (which can but need not be the same as the first zone) and/or includes audio data generated by a set of microphones and associated with the zone. The input data can indicate that a change to the permissions currently associated with the first zone.

The flow may also include operation 1504, where the computing component determines the zone associated with the input data. For example, in the case of the input data is received from the display, the input data can include a display identifier that is then used in a look-up of configuration data to determine the zone identifier of the zone. If the input data includes audio data, the input data can indicate the zone identifier.

The flow may also include operation 1506, where the computing component determines permissions associated with the zone. For example, the zone identifier is used in a look-up of permission data.

The flow may also include operation 1508, where the computing component determines whether the permission change is permitted based on the permission data associated with the zone. For example, the permission data can indicate that changing the permission for the first zone is enabled for the zone. In this case, a positive determination is made and operation 1510 follows operation 1508. Otherwise, operation 1514 follows operation 1508.

The flow may also include operation 1510, where the computing component updates the permission data of the first zone. For example, the zone identifier of the first zone is used to associate, in the permission data, the requested permission with the first zone.

The flow may also include operation 1512, where the computing component causes a speaker and/or a display in the zone to indicate the permission change. For example, data indicating this change is sent to the speaker and/or the display along with a presentation command.

The flow may also include operation 1514, where the computing component determines a second zone having a permission to authorize the change. Here, the zone determined at operation 1504 lacks the permission for the change.

Instead, the computing component look up the permission data to determine which of the zones is associated with a permission that enables controlling the change. The result of the look-up includes a second zone identifier of the second zone.

The flow may also include operation 1516, where the computing component sends request data to a speaker and/or display associated with the second zone. For example, the configuration data is looked up to determine the speaker identifier and/or display identifier associated with the second zone. The request data is sent accordingly along with a presentation command and can indicate a request to approve the change.

The flow may also include operation 1518, where the computing component determines whether the change is approved. For example, input data is received from the display in the second zone or from a set of microphones indicating that the input data is associated with the second zone. This input data can indicate an approval or a denial of the request. If approved, operation 1510 follows operation 1518. Otherwise, operation 1520 follows operation 1518.

The flow may also include operation 1520, where the computing component where the computing component forgoes performing the change. For example, the request is denied and no change to permission data is made.

The flow may also include operation 1522, where the computing component causes the speaker and/or the display in the zone to indicate the denial. For example, data indicating the denial is sent to any of such components along with a presentation command.

Figure 16:
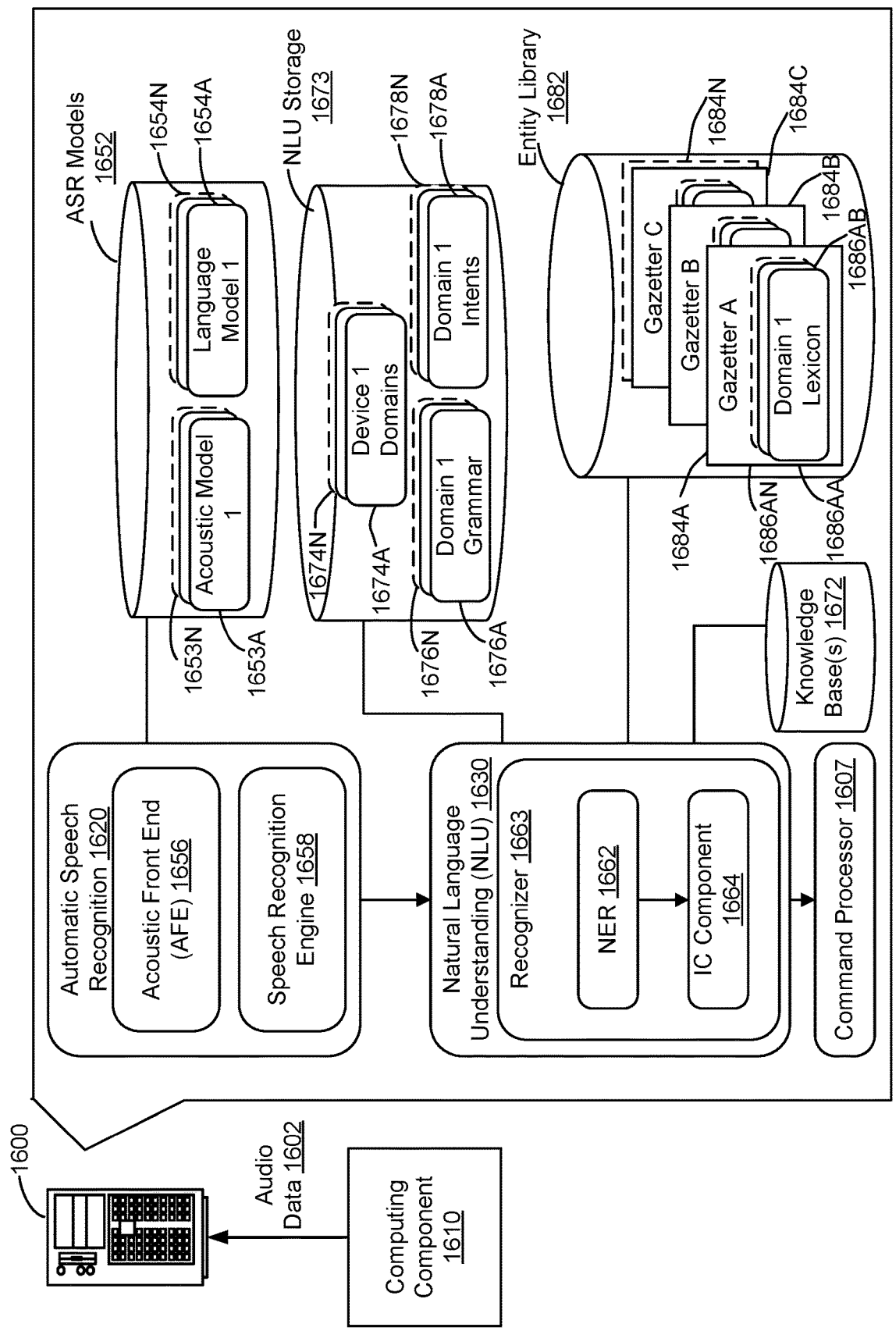
FIG. 16 illustrates an example of components of a computer system, according to embodiments of the present disclosure.

FIG. 16 illustrates an example of components of a computer system 1600 (an example set of computers 270 of FIG. 2), according to embodiments of the present disclosure. The computer system 1600 can be used in association with processing a spoken utterance, allowing a system to capture and execute commands spoken by a user, such as spoken commands that may follow a wake word, or trigger expression (e.g., a predefined word or phrase for "waking" a device, causing the device to begin sending audio data to a remote system). The various components illustrated may be located on a same or different physical devices. Communication between various components illustrated in FIG. 16 may occur directly or across a network. An audio capture component, such as a microphone of a computing component 1610, captures audio 1603 corresponding to a spoken utterance. In an example, the computing component 1610 can be any of the above described computing components included in vehicle system, such as the computing component 210 of FIG. 2 included in the vehicle system 300 of FIG. 3. Using a wake word detection component 1601, the computing component 1610 then processes audio data corresponding to the audio 1603 to determine if a keyword (such as a wake word) is detected in the audio data. Following detection of a wake word, the computing component 1610 sends audio data 1602 corresponding to the utterance to the computer system 1600 that includes an ASR component 1620. The ASR component 1620 can be a part of a conversation management system.

The audio data 1602 may be output from an optional acoustic front end (AFE) 1656 located on the device prior to transmission. In other instances, the audio data 1602 may be in a different form for processing by a remote AFE 1656, such as the AFE 1656 located with the ASR component 1620 of the computer system 1600.

The wake word detection component 1601 works in conjunction with other components of the user device, for example a microphone to detect keywords in audio 1603.

For example, the device may convert audio 1603 into audio data, and process the audio data with the wake word detection component 1601 to determine whether human sound is detected, and if so, if the audio data comprising human sound matches an audio signature and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wake word detection component 1601 to perform wake word detection to determine when a user intends to speak a command to the user device. This process may also be referred to as keyword detection, with the wake word being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wake word detection component 1601 may compare audio data to stored models or data to detect a wake word. One approach for wake word detection applies general large vocabulary continuous speech recognition (LVCSR) systems to decode the audio signals, with wake word searching conducted in the resulting lattices or confusion networks. LVCSR decoding may require relatively high computational resources. Another approach for wake word spotting builds hidden Markov models (HMM) for each key wake word and non-wake word speech signals respectively. The non-wake word speech includes other spoken words, background noise, etc. There can be one or more HMMs built to model the non-wake word speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wake word spotting system may be built on deep neural network (DNN)/recursive neural network (RNN) structures directly, without HMM involved. Such a system may estimate the posteriors of wake words with context information, either by stacking frames within a context window for DNN, or using RNN. Following-on posterior threshold tuning or smoothing is applied for decision making. Other techniques for wake word detection, such as those known in the art, may also be used.

Once the wake word is detected, the local computing component 1610 may "wake" and begin transmitting audio data 1602 corresponding to input audio 1603 to the computer system 1600 for speech processing. Audio data corresponding to that audio may be sent to the computer system 1600 for routing to a recipient device or may be sent to the computer system 1600 for speech processing for interpretation of the included speech (either for purposes of enabling voice-communications and/or for purposes of executing a command in the speech). The audio data 1602 may include data corresponding to the wake word, or the portion of the audio data corresponding to the wake-word may be removed by the local computing component 1610 prior to sending. Further, a local device may "wake" upon detection of speech/spoken audio above a threshold, as described herein. Upon receipt by the remote computer system 1600, an ASR component 1620 may convert the audio data 1602 into text. The ASR transcribes audio data into text data representing the words of the speech contained in the audio data 1602. The text data may then be used by other components for various purposes, such as executing system commands, inputting data, etc. A spoken utterance in the audio data is input to a processor configured to perform ASR which then interprets the utterance based on the similarity between the utterance and pre-established language models 1654 stored in an ASR model knowledge base (ASR Models Storage 1652). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (e.g., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 1653 stored in an ASR Models Storage 1652), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 1620 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 1656 and a speech recognition engine 1658. The acoustic front end (AFE) 1656 transforms the audio data from the microphone into data for processing by the speech recognition engine 1658. The speech recognition engine 1658 compares the speech recognition data with acoustic models 1653, language models 1654, and other data models and information for recognizing the speech conveyed in the audio data. The AFE 1656 may reduce noise in the audio data and divide the digitized audio data into frames representing time intervals for which the AFE 1656 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 1658 may process the output from the AFE 1656 with reference to information stored in speech/model storage (1652). Alternatively, post front-end processed data (such as feature vectors) may be received by the device executing ASR processing from another source besides the internal AFE. For example, the user device may process audio data into feature vectors (for example using an on-device AFE 1656) and transmit that information to a server across a network for ASR processing. Feature vectors may arrive at the remote computer system 1600 encoded, in which case they may be decoded prior to processing by the processor executing the speech recognition engine 1658.

The speech recognition engine 1658 attempts to match received feature vectors to language phonemes and words as known in the stored acoustic models 1653 and language models 1654. The speech recognition engine 1658 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, add the music to the kitchen," or "Alexa, move the music to the kitchen," or "Alexa, stop the music in the kitchen." The wake detection component may identify the wake word, otherwise described as a trigger expression, "Alexa" in the user utterance and may "wake" based on identifying the wake word. Audio data corresponding to the user utterance may be sent to the remote computer system 1600 where the speech recognition engine 1658 may identify, determine, and/or generate text data corresponding to the user utterance, here "Add the music to the kitchen," "Move the music to the kitchen," or "Stop the music in the kitchen." The speech recognition engine 1658 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 1658 to other processing components, which may be local to the device performing ASR and/or distributed across the network(s). For example, ASR results in the form of a single textual representation of the speech, an N-best list including multiple hypotheses and respective scores, lattice, etc. may be sent to the remote computer system 1600, for natural language understanding (NLU) processing, such as conversion of the text into commands for execution, either by the user device, by the remote computer system 1600, or by another device (such as a server running a specific application like a search engine, etc.).

The device performing NLU processing may include various components, including potentially dedicated processor(s), memory, storage, etc. As shown in FIG. 16, an NLU component 1630 may include a recognizer 1663 that includes a named entity recognition (NER) component 1662 which is used to identify portions of query text that correspond to a named entity that may be recognizable by the system. A downstream process called named entity resolution links a text portion to a specific entity known to the system. To perform named entity resolution, the system may utilize gazetteer information (1684a-1684n) stored in entity library storage 1682. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

Generally, the NLU process takes textual input (such as processed from ASR 1620 based on the utterance input audio 1603) and attempts to make a semantic interpretation of the text. That is, the NLU process determines the meaning behind the text based on the individual words and then implements that meaning. NLU processing interprets a text string to derive an intent or a desired action from the user as well as the pertinent pieces of information in the text that allow the computing component 1610 to complete that action. For example, if a spoken utterance is processed using ASR and outputs the text "Add music to the kitchen" the NLU process may determine that the user intended for the audio being output by a device also be output by another device associated with the identifier of kitchen.

The NLU may process several textual inputs related to the same utterance. For example, if the ASR outputs N text segments (as part of an N-best list), the NLU may process all N outputs to obtain NLU results.

As will be discussed further below, the NLU process may be configured to parse and tag to annotate text as part of NLU processing. For example, for the text "Move the music to the kitchen," "move" may be tagged as a command (to output audio on a device) and "kitchen" may be tagged as a specific device to output the audio on instead of the previous device.

To correctly perform NLU processing of speech input, an NLU process may be configured to determine a "domain" of the utterance so as to determine and narrow down which services offered by the endpoint device (e.g., remote computer system 1600 or the user device) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 1662 receives a query in the form of ASR results and attempts to identify relevant grammars and lexical information that may be used to construe meaning. To do so, the NLU component may begin by identifying potential domains that may relate to the received query. The NLU storage 1673 includes a database of devices (1674a-1674n) identifying domains associated with specific devices. For example, the user device may be associated with domains for music, telephony, calendaring, contact lists, and device-specific communications, but not video. In addition, the entity library may include database entries about specific services on a specific device, either indexed by Device ID, User ID, or Household ID, or some other indicator.

In NLU processing, a domain may represent a discrete set of activities having a common theme, such as "shopping," "music," "calendaring," etc. As such, each domain may be associated with a particular recognizer 1663, language model and/or grammar database (1676a-1676n), a particular set of intents/actions (1678a-1678n), and a particular personalized lexicon (1686). Each gazetteer (1684a-1684n) may include domain-indexed lexical information associated with a particular user and/or device. For example, the Gazetteer A (1684a) includes domain-index lexical information 1686aa to 1686an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both communications and, for example, music, the query may, substantially in parallel, be NLU processed using the grammar models and lexical information for communications and will be processed using the grammar models and lexical information for music. The responses based on the query produced by each set of models is scored, with the overall highest ranked result from all applied domains ordinarily selected to be the correct result.

An intent classification (IC) component 1664 parses the query to determine an intent or intents for each identified domain, where the intent corresponds to the action to be performed that is responsive to the query. Each domain is associated with a database (1678a-1678n) of words linked to intents. For example, a music intent database may link words and phrases such as "add," "move," "remove," "quiet," "volume off;" and "mute" to a "mute" intent. A voice-message intent database, meanwhile, may link words and phrases such as "Send a message," "Send a voice message," "Send the following," or the like. The IC component 1664 identifies potential intents for each identified domain by comparing words in the query to the words and phrases in the intents database 1678. In some instances, the determination of an intent by the IC component 1664 is performed using a set of rules or templates that are processed against the incoming text to identify a matching intent.

In order to generate a particular interpreted response, the NER 1662 applies the grammar models and lexical information associated with the respective domain to actually recognize a mention of one or more entities in the text of the query. In this manner, the NER 1662 identifies "slots" or values (e.g., particular words in query text) that may be needed for later command processing. Depending on the complexity of the NER 1662, it may also label each slot with a type of varying levels of specificity (such as noun, place, city, artist name, song name, device identification, audio identification, audio-session queue identification, or the like). Each grammar model 1676 includes the names of entities (e.g., nouns) commonly found in speech about the particular domain (e.g., generic terms), whereas the lexical information 1686 from the gazetteer 1684 is personalized to the user(s) and/or the device. For instance, a grammar model associated with the shopping domain may include a database of words commonly used when people discuss shopping. In case an entity is not identified for a slot, the NER 1662 can query contextual data, such as contextual data 142 to identify the value.

The intents identified by the IC component 1664 are linked to domain-specific grammar frameworks (included in 1676) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "Add the music to the kitchen" is an identified intent, a grammar (1076) framework or frameworks may correspond to sentence structures such as "Add {audio-session queue} to {kitchen}."

For example, the NER component 1662 may parse the query to identify words as subject, object, verb, preposition, etc., based on grammar rules and/or models, prior to recognizing named entities. The identified verb may be used by the IC component 1664 to identify intent, which is then used by the NER component 1662 to identify frameworks. A framework for the intent of "Play a song," meanwhile, may specify a list of slots/fields applicable to play the identified "song" and any object modifier (e.g., specifying a music collection from which the song should be accessed) or the like. The NER component 1662 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 1662 may search the database of generic words associated with the domain (in the knowledge base 1672). So, for instance, if the query was "Add the music to the kitchen," after failing to determine which device corresponds to the identify of "kitchen," the NER component 1662 may search the domain vocabulary for device identifiers associated with the word "kitchen." In the alternative, generic words may be checked before the gazetteer information, or both may be tried, potentially producing two different results.

The output data from the NLU processing (which may include tagged text, commands, etc.) may then be sent to a command processor 1607. The destination command processor 1607 may be determined based on the NLU output. For example, if the NLU output includes a command to send a message, the destination command processor 1607 may be a message sending application, such as one located on the user device or in a message sending appliance, configured to execute a message sending command. If the NLU output includes a search request, the destination command processor 1607 may include a search engine processor, such as one located on a search server, configured to execute a search command. After the appropriate command is generated based on the intent of the user, the command processor 1607 may provide some or all of this information to a text-tospeech (TTS) engine. The language output engine may then generate an actual audio file for outputting the audio data determined by the command processor 1607 (e.g., "playing in the kitchen," or "music moved to the kitchen"). After generating the file (or "audio data"), the language output engine may provide this data back to the remote computer system 1600.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component during runtime operations where NLU operations are performed on text (such as text output from an ASR component). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 1663. Each recognizer may include various NLU components such as an NER component 1662, IC component 1664 and other components such as an entity resolver, or other components.

For example, a messaging domain recognizer 1663-A (Domain A) may have an NER component 1662-A that identifies what slots (e.g., portions of input text) may correspond to particular words relevant to that domain. The words may correspond to entities such as (for the messaging domain) a recipient. An NER component 1662 may use a machine learning model, such as a domain specific conditional random field (CRF) to both identify the portions corresponding to an entity as well as identify what type of entity corresponds to the text portion. The messaging domain recognizer 1663-A may also have its own intent classification (IC) component 1664-A that determines the intent of the text assuming that the text is within the proscribed domain. An IC component may use a model, such as a domain specific maximum entropy classifier to identify the intent of the text, where the intent is the action the user desires the system to perform. For this purpose, the remote system computing device may include a model training component. The model training component may be used to train the classifier(s)/machine learning models discussed above.

As noted above, multiple devices may be employed in a single speech processing system. In such a multi-device system, each of the devices may include different components for performing different aspects of the speech processing. The multiple devices may include overlapping components. The components of the user device and the remote computer system 1600, as illustrated herein are exemplary, and may be located in a stand-alone device or may be included, in whole or in part, as a component of a larger device or system, may be distributed across a network or multiple devices connected by a network, etc.

Figure 17:
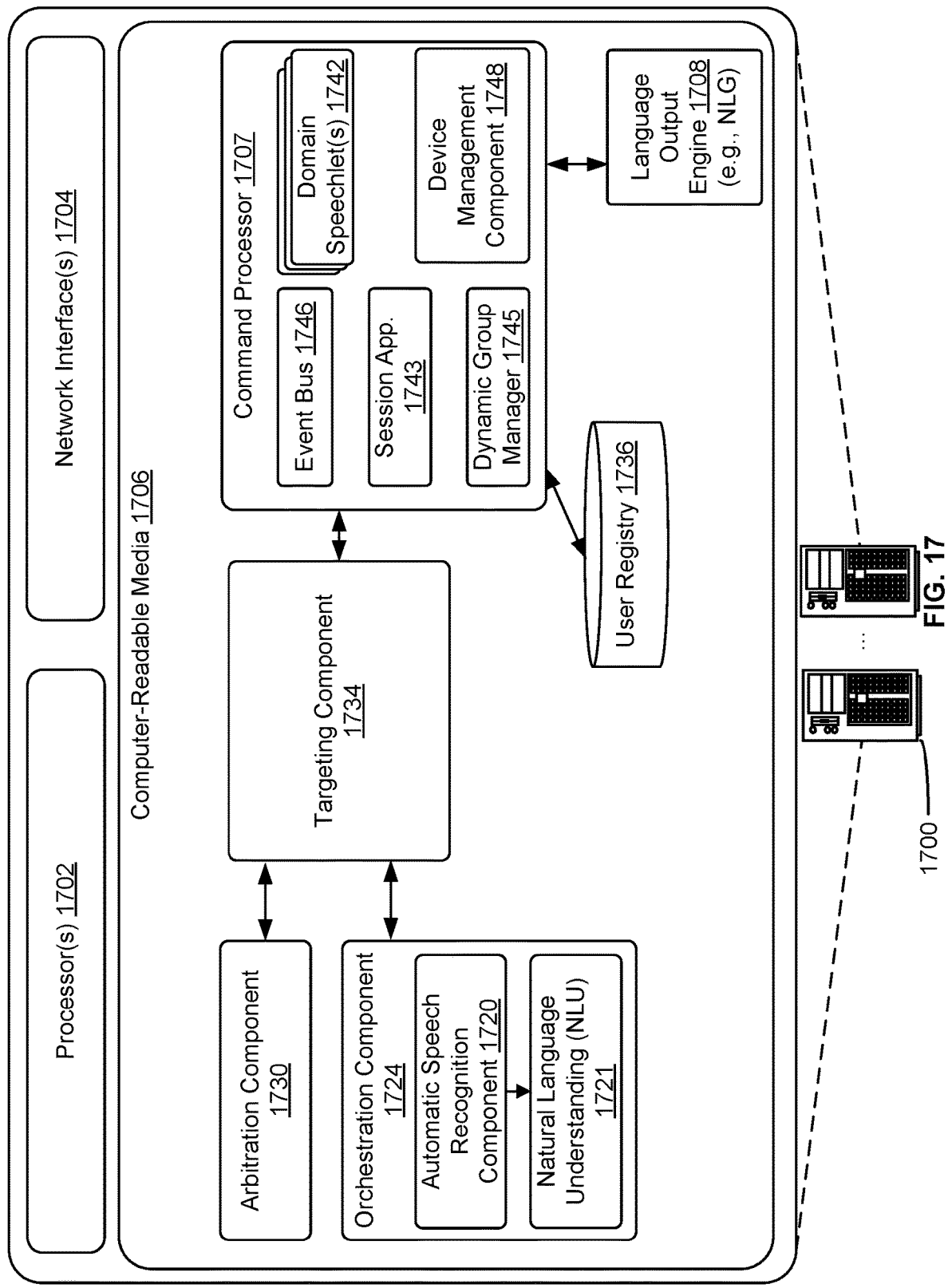
FIG. 17 illustrates another example of components of a computer system, according to embodiments of the present disclosure.

FIG. 17 illustrates another example of components of a computer system 1700 an example of the set of computers 270 of FIG. 2), according to embodiments of the present disclosure. The computer system 1700 associates audio output commands with multiple devices, including a command processor 1707 configured to generate a command that the selected voice-enabled device uses to respond to a user utterance. As used with respect to FIG. 17, a voice-enabled device may include a device, such as any of the devices described herein above. As illustrated in FIG. 17, the computer system 1700, including the orchestration component 1724 and a speech processing component comprising an ASR component 1720 and an NLU component 1721, may be coupled to a targeting component 1734 and provide the targeting component 1734 with the intent determined to be expressed in the user utterance. Further, the arbitration component 1730 may provide the ranked list of devices to the targeting component 1734, as well as device indicators (e.g., IP addresses, devices names, etc.) for one or more of the voice-enabled devices in the ranked list of devices. The targeting component 1734 may then perform techniques to determine a target device (e.g., a device to perform the requested operation), and provide various data to the command processor 1707. For instance, the targeting component 1734 may provide the command processor 1707 with various device identifiers of the voice-enabled devices, the determined target device, the determined intent and/or command, etc. By way of example, the targeting component 1734 may determine which devices to add to a grouping of device, which devices to remove from a grouping of devices, and/or which devices to move an audio-session to.

The command processor 1707 and/or NLU component 1721 may determine a domain based on the intent and, based on this determination, route the request corresponding to the audio data to the appropriate domain speechlet, such as the illustrated domain speechlets 1742. The domain speechlet 1742 may comprise any type of device or group of devices (e.g., hardware device, virtual devices or partitions, server, etc.), and may receive the text data and/or an intent associated with the audio signals and may determine how to respond to the request. For instance, the intent for a command "Add the music to the kitchen" may be routed to a music domain speechlet 1742, which controls devices, such as speakers, connected to the voice-enabled devices. The music domain speechlet 1742 may determine a command to generate based on the intent of the user to output audio on a device associated with the kitchen identifier as when as continuing to output the audio on another device that is currently outputting the audio. Additionally, the music domain speechlet 1742 may determine additional content, such as audio data, to be output by one of the voice-enabled devices, such as "Kitchen has been added to your audio session."

Various types of domain speechlets 1742 may be used to determine which devices to send commands to and/or to use in response to a user utterance, as well as the appropriate response and potential additional content (e.g., audio data). For example, the domain speechlets 1742 may include a third party skills domain speechlet 1742, which may handle intents associated with gaming, productivity, etc., a music domain speechlet 1742, which may handle intents associated with music play requests, and/or an information domain speechlet 1742, which may handle requests for information associated, for example, with the status of a particular device and/or content being utilized and/or output by a particular device and/or group of devices.

After the domain speechlet 1742 generates the appropriate command, which may be described herein as directive data, based on the intent of the user, and/or provides additional content, such as audio data, to be output by one of the voice-enabled devices, the domain speechlet 1742 may provide this information back to the computer system 1700, which in turns provides some or all of this information to a language output engine 1708. The language output engine 1708 can implement an NLG component and/or a TTS component to generate an actual audio file for outputting the second audio data determined by the domain speechlet 1742. After generating the file (or "audio data"), the language output engine 1708 may provide this data back to the computer system 1700.

The NLG component can generate text for purposes of TTS output to a user. For example the NLG component may generate text corresponding to instructions for a particular action for the user to perform. The NLG component may generate appropriate text for various outputs as described herein. The NLG component may include one or more trained models configured to output text appropriate for a particular input. The text output by the NLG component may become input for the TTS component (e.g., output text data discussed below). Alternatively or in addition, the TTS component may receive text data from a skill component or other system component for output.

The NLG component may include a trained model. The trained model can generate output text data such that the output text data has a natural feel and, in some embodiments, includes words and/or phrases specifically formatted for a requesting individual. The NLG may use templates to formulate responses. And/or the NLG system may include models trained from the various templates for forming the output text data. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the TTS component.

The TTS component may generate audio data (e.g., synthesized speech) from text data using one or more different methods. Text data input to the TTS component may come from a skill component or another component of the system. In one method of synthesis called unit selection, the TTS component matches text data against a database of recorded speech. The TTS component selects matching units of recorded speech and concatenates the units together to form audio data. In another method of synthesis called parametric synthesis, the TTS component varies parameters such as frequency, volume, and noise to create audio data including an artificial speech waveform. Parametric synthesis uses a computerized voice generator, sometimes called a vocoder.

The computer system 1700 may then publish (e.g., write) some or all of this information to an event bus 1746. That is, the computer system 1700 may provide information regarding the initial request (e.g., the speech, the text, the domain/intent, etc.), the response to be provided to the voice-enabled device, or any other information pertinent to the interaction between the voice-enabled device and the computer system 1700 to the event bus 1746.

Within the computer system 1700, one or more components or services, including a contextual data manager 1745, may subscribe to the event bus 1746 so as to receive information regarding interactions between user devices and the computer system 1700. The contextual data manager 1745 can be responsible for maintaining contextual data 1737 in a data store. In the illustrated example, for instance, the device management component 1748 may subscribe to the event bus 1746 and, thus, may monitor information regarding these interactions. In some examples, monitoring information in the event bus 1746 may comprise communications between various components of the computer system 1700. For example, the targeting component 1734 may monitor the event bus 1746 to identify device state data for voice-enabled devices. In some examples, the event bus 1746 may "push" or send indications of events and/or device state data to the targeting component 1734. Additionally, or alternatively, the event bus 1746 may be "pulled" where the targeting component 1734 sends requests to the event bus 1746 to provide an indication of device state data for a voice-enabled device. The event bus 1746 may store indications of the device states for the devices, such as in a database (e.g., user registry 1736), and using the stored indications of the device states, send the device state data for voice-enabled devices to the targeting component 1734. Thus, to identify device state data for a device, the targeting component 1734 may send a request to the event bus 1746 (e.g., event component) to provide an indication of the device state data associated with a device, and receive, from the event bus 1746, the device state data that was requested.

The device management component 1748 functions to monitor information published to the event bus 1746 and identify events that may trigger action. For instance, the device management component 1748 may identify (e.g., via filtering) those events that: (i) come from voice-enabled devices that are associated with secondary device(s) (e.g., have secondary devices in their environments such as televisions, personal computing devices, etc.), and (ii) are associated with supplemental content (e.g., image data, video data, etc.). The device management component 1748 may reference the user registry 1736 to determine which voice-enabled devices are associated with secondary devices, as well as determine device types, states, and other capabilities of these secondary devices. For instance, the device management component 1748 may determine, from the information published to the event bus 1746, an identifier associated with the voice-enabled device making the corresponding request or the voice-enabled device selected to respond to or act upon the user utterance. The device management component 1748 may use this identifier to identify, from the user registry 1736, a user account associated with the voice-enabled device. The device management component 1748 may also determine whether any secondary devices have been registered with the identified user account, as well as capabilities of any such secondary devices, such as how the secondary devices are configured to communicate (e.g., via Wi-Fi, short-range wireless connections, etc.), the type of content the devices are able to output (e.g., audio, video, still images, flashing lights, etc.), and the like. For example, the secondary devices may include speakers that may wirelessly communicate with the voice-enabled device and/or one or more other secondary devices, such as personal devices.

The device management component 1748 may determine whether a particular event identified is associated with supplemental content. That is, the device management component 1748 may write, to a datastore, indications of which types of events and/or which primary content or responses are associated with supplemental content. In some instances, the computer system 1700 may provide access to third-party developers to allow the developers to register supplemental content for output on secondary devices for particular events and/or primary content. For example, if a voice-enabled device is to output that the weather will include thunder and lightning, the device management component 1748 may store an indication of supplemental content such as thunder sounds, pictures/animations of lightning and the like. In another example, if a voice-enabled device is outputting information about a particular fact (e.g., "a blue whale is the largest mammal on earth . . . "), then a secondary device, such as television, may be configured to provide supplemental content such as a video or picture of a blue whale. In another example, if a voice-enabled device is outputting audio, then a second device, such as a speaker, may be configured to also output the audio based at least in part on a user utterance representing a request to add the secondary device to the audio session. In these and other examples, the device management component 1748 may store an association between the primary response or content (e.g., outputting of information regarding the world's largest mammal) and corresponding supplemental content (e.g., the audio data, image data, or the like). In some instances, the device management component 1748 may also indicate which types of secondary devices are to output which supplemental content. For instance, in the instant example, the device management component 1748 may store an indication that secondary devices of a class type "tablet" are to output a picture of a blue whale. In these and other instances, meanwhile, the device management component 1748 may store the supplemental content in association with secondary-device capabilities (e.g., devices with speakers output the audio commentary, devices with screens output the image, etc.).

The device management component 1748 may also determine how to transmit response and/or supplement content (and/or information acquiring the content) to the voice-enabled devices and/or the secondary devices. To make this determination, the device management component 1748 may determine a device type of the voice-enabled devices and/or secondary devices, capabilities of the device(s), or the like, potentially as stored in the user registry 1736. In some instances, the device management component 1748 may determine that a particular device is able to communicate directly with the computer system 1700 (e.g., over Wi-Fi) and, thus, the device management component 1748 may provide the response and/or content directly over a network to the secondary device (potentially via the computer system 1700). In another example, the device management component 1748 may determine that a particular secondary device is unable to communicate directly with the computer system 1700, but instead is configured to communicate with a voice-enabled device in its environment over short-range wireless networks. As such, the device management component 1748 may provide the supplement content (or information) to the computer system 1700, which in turn may send this to the voice-enabled device, which may send the information over a short-range network to the secondary device.

The computer-readable media 1706 may further include the user registry 1736 that includes data regarding user profiles as described herein. The user registry 1736 may be located in part of, or proximate to, the computer system 1700, or may otherwise be in communication with various components, for example over the network. The user registry 1736 may include a variety of information related to individual users, accounts, etc. that interact with the voice-enabled devices, and the computer system 1700. For illustration, the user registry 1736 may include data regarding the devices associated with particular individual user profiles. Such data may include user or device identifier (ID) and internet protocol (IP) address information for different devices as well as names by which the devices may be referred to by a user. Further qualifiers describing the devices may also be listed along with a description of the type of object of the device. Further, the user registry 1736 may store indications of associations between various voice-enabled devices and/or secondary device, such as virtual clusters of devices, states of devices, and associations between devices and audio-session queues. The user registry 1736 may represent clusters of devices and/or as single devices that can receive commands and disperse the commands to each device and/or in the cluster. In some examples, the virtual cluster of devices may be represented as a single device which is determined as being capable, or not capable (e.g., offline), of performing a command in a user utterance. A virtual cluster of devices may generally correspond to a stored grouping of devices, or a stored association between a group of devices.

In some examples, the device state for devices associated with a user account may indicate a current state of the device. In this way, the command processor 1707 and/or the domain speechlets 1742 may determine, based on the stored device states in the user registry 1736, a current device state of the voice-enabled devices. Rather than receiving device states for the voice-enabled devices, in metadata, the device states may already have been determined or received and stored in the user registry 1736. Further, the user registry 1736 may provide indications of various permission levels depending on the user. As an example, the computer system 1700 may perform speaker recognition on audio signals to determine an identity of the speaker. If the speaker is a child, for instance, the child profile may have permission restrictions where they are unable to request audio to be output via certain devices and/or to output certain audio on one or more of the devices, for example. Conversely, a parent profile may be able to direct output of audio without restrictions. In some examples, to determine the device state, the event bus 1746 may publish different events which indicate device states to various entities or components that subscribe to the event bus 1746. For instance, if an event of "Play music" occurs for a voice-enabled device, the event bus 1746 may publish the indication of this event, and thus the device state of outputting audio may be determined for the voice-enabled device. Thus, various components, such as the targeting component 1734, may be provided with indications of the various device states via the event bus 1746. The event bus 1746 may further store and/or update device states for the voice-enabled devices in the user registry 1736. The components of the computer system 1700 may query the user registry 1736 to determine device states.

A particular user profile may include a variety of data that may be used by the computer system 1700. For example, a user profile may include information about what voice-enabled devices are associated with the user and/or user profile. The user profile may further indicate an IP address for each of the devices associated with the user and/or user profile, user IDs for the devices, indications of the types of devices, and current device states for the devices.

Figure 18:
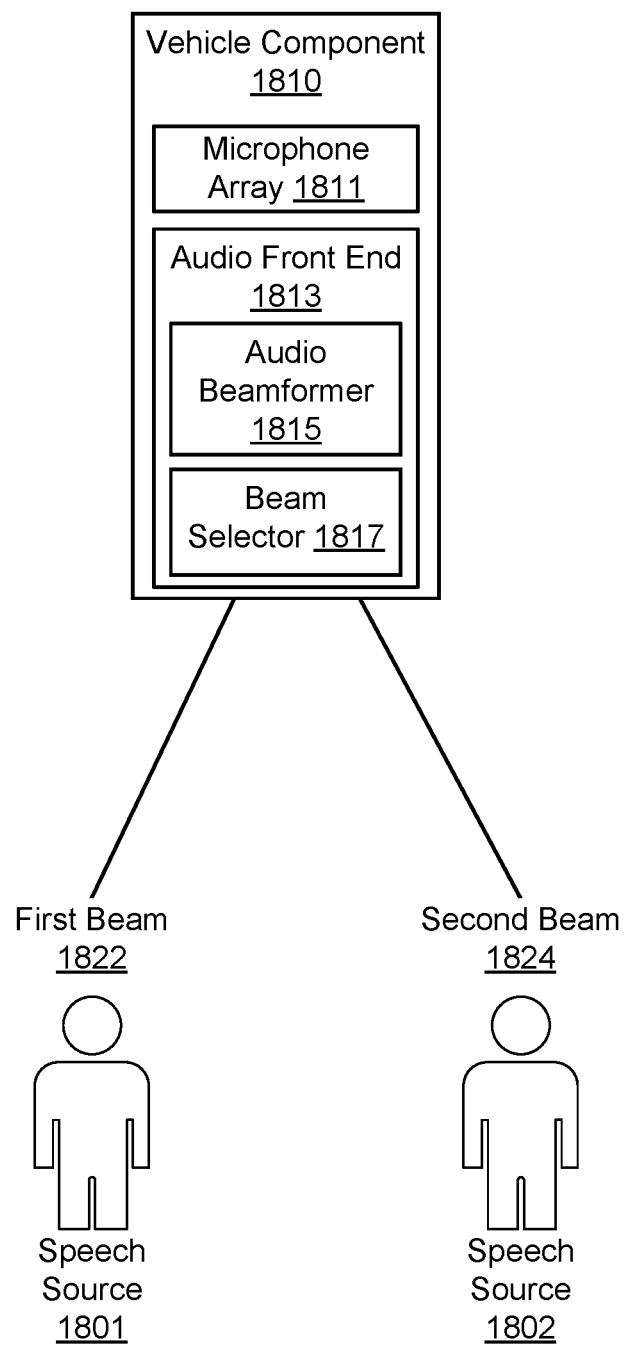
FIG. 18 illustrates an example of audio beamforming, according to embodiments of the present disclosure.

FIG. 18 illustrates an example of audio beamforming, according to embodiments of the present disclosure. The audio beamforming can be performed by a vehicle component 1810, which correspond to a combination of the audio processing circuitry 420 and the microphones 416 of FIG. 4.

In an example, the vehicle component 1810 includes a microphone array 1811 (e.g., the microphones 416) that detects audio and generates audio signals that represent the audio. The vehicle component 1810 also includes an audio front end 1813 (e.g., a component of the audio processing circuitry 420, such as the audio DSP 510 of FIG. 5) that receives and processes the audio signals to generate audio data 1812 that represents the audio. In particular, the audio front end 1813 includes an audio beamformer 1815 and a beam selector 1817. The audio beamformer 1815 enhances an audio signal from a direction while suppressing audio signals from other directions to generate an enhanced audio signal per direction, which can be referred as a beam or, equivalently, an audio beam. In turn, the beam selector 1817 selects a beam (e.g., one of the enhanced audio signals). The audio front 1813 can generate and output audio data that represents this beam. The audio front end 1813 can store zone configuration data indicating a direction for each zone and associating the direction with a zone identifier. Based on the direction of the selected beam and the zone configuration data, the audio front end 1813 associated the audio data with a zone identifier (e.g., by including the zone identifier in metadata data of the audio data).

The microphone array 1811 can include a plurality of microphones that are spaced from each other in a known or predetermined configuration (e.g., within a vehicle). For instance, the microphone array 1811 may be a two-dimensional array, wherein the microphones are positioned within a single plane. In another illustration, the microphone array 1811 may be a three-dimensional array, in which the microphones are positioned in multiple planes. The number of microphones can depend on the type of the vehicle component 1810. Generally, accuracy and resolution of audio beamforming may be improved by using higher numbers of microphones.

The audio beamformer 1815 may use signal processing techniques to combine signals from the different microphones of the microphone array 1811 so that audio signals originating from a particular direction are enhanced while audio signals from other directions are deemphasized. For instance, the audio signal signals from the different microphones are phase-shifted by different amounts so that audio signals from a particular direction interfere constructively, while audio signals from other directions experience interfere destructively. The phase shifting parameters used in beamforming may be varied to dynamically select different directions. Additionally, or alternatively, differences in audio arrival times at different microphones of the microphone array 1811 can be used. Differences in arrival times of audio at the different microphones are determined and then analyzed based on the known propagation speed of sound to determine a point from which the sound originated. This process involves first determining differences in arrivals times using signal correlation techniques between the audio signals of the different microphones, and then using the time-of-arrival differences as the basis for sound localization.

The beam selector 1817 can receive the enhanced audio signals (e.g., the beams) and can perform measurements on such signals. The measurements can use a reference audio signal, such as an audio signal of one of the microphones of the microphone array 1811, or multiple reference audio signals, such as the audio signal of each microphone of the microphone array 1811. The measurement on an enhanced audio signal can include determining a property of this signal, such as the signal-to-noise (SNR) ratio or signal-to-interference (SIR) ratio. Generally, the beam selector 1817 selects the enhanced audio signal that has the best measurement (e.g., the largest SNR or the largest SIR).

The audio processing of the audio front end 1813, including the audio beamformer 1815 and the beam selector 1817 can be performed in the analog domain and/or the digital domain. Some of the operations further include noise cancelation, signal filtering, and other audio processing techniques.

In the illustrative example of FIG. 18, a speech source 1801 (e.g., a first passenger) is present in proximity of the vehicle component 1810 (e.g., by being in the vehicle). Proximity refers to the vehicle component 1810 being capable of detecting noise audio generated by the speech source 1801. Upon speech audio from the speech source 1801, the audio front end 1813 may select a beam having a direction towards the speech source 1801. This beam is shown in FIG. 18 as a first beam 1822 and corresponds to an enhanced audio signal that is determined from the audio signals generated by the microphones of the microphone array 1811 and that is associated with the direction towards the speech source 1801.

Subsequently, the vehicle component 1810 detects speech audio from a second speech source 1802 (e.g., a first passenger). Depending on characteristics of this audio, the audio front end 1813 can determine that this second audio corresponds to noise or to speech input corresponding to a second beam 1802. In an example, the characteristics correspond to noise characteristics (e.g., RSSI is lower than a threshold value). In this case, the audio front end 1813 can suppress this speech audio by performing noise cancellation operations thereon. In another example, the characteristics indicate speech input (e.g., the RSSI being larger than the threshold value and/or similar to the RSSI of the first beam 1822). In this case, the second beam 1824 is selected. Zone interference cancellation can be performed in the time domain or the frequency domain, whereby the first beam 1822 can be filtered out from the second beam 1824 and vice versa. Generally, the utterance audio is louder than the noise audio.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A vehicle system comprising:
one or more processors; and
one or more memory storing instructions that, upon execution by the one or more processors, configure the vehicle system to:
store first data indicating that a first speaker and a first display are associated with a first zone identifier of a vehicle;
store second data indicating that a second speaker and a second display are associated with a second zone identifier of the vehicle;
store third data indicating that the first zone identifier is associated with a first permission;
store fourth data indicating that the second zone identifier is associated with a second permission different from the first permission;
cause a first output of audio content by the first speaker;
cause the first display to output a first graphical user interface that, based at least in part on the first permission, identifies the audio content and includes a first control component associated with controlling the first output via the first display;
cause a second output of the audio content by the second speaker; and
cause the second display to output a second graphical user interface that, based at least in part on the second permission, identifies the audio content and excludes a second control component associated with controlling the second output via the second display;
cause, based at least in part on user input associated with the first zone identifier, a change to the second permission such that the second permission enables controlling the second output; and
cause, based at least in part on the change, a first presentation via the second speaker or the second display of an indication that controlling the second output is permitted and a second presentation of the second control component via the second display, the first presentation being different from the second presentation.

2. The vehicle system of claim 1, wherein the audio content is first audio content, wherein the second permission enables browsing an audio content library and requesting second audio content from the audio content library, and wherein the one or more memory store additional instructions that, upon execution by the one or more processors, configure the vehicle system to:
cause a presentation of a browse component in the second graphical user interface;
cause a presentation of the audio content library in the second graphical user interface upon a selection of the browse component;
determine that the second audio content is selected from the audio content library; and
cause, in the first graphical user interface, a presentation of a request component associated with requesting the second audio content to be output by the second speaker.

3. The vehicle system of claim 1, wherein the one or more memory store additional instructions that, upon execution by the one or more processors, configure the vehicle system to:
cause, in the first graphical user interface, a presentation of a permission component associated with permitting the audio content to be controlled;
determine that controlling the audio content is permitted in association with the second zone identifier upon a selection of the permission component via the first graphical user interface;
store fifth data indicating that the second zone identifier is associated with a third permission that enables controlling the audio content; and
cause the second presentation of the second control component in the second graphical user interface.

4. A computer-implemented method comprising:
determining that a first zone identifier is associated with at least a first permission that enables identifying first content output and enables controlling the first content output;
determining that a second zone identifier is associated with at least a second permission that enables identifying second content output and prohibits controlling the second content output;
causing the first content output by a first speaker associated with the first zone identifier;
causing, based at least in part on the first permission, a first display to present a first graphical user interface that identifies the first content output and includes a first content control component, the first display associated with the first zone identifier;
causing the second content output by a second speaker associated with the second zone identifier;
causing, based at least in part on the second permission, a second display to present a second graphical user interface that identifies the second content output and excludes a second content control component associated with controlling the second content output via the second display, the second display associated with the second zone identifier;
causing, based at least in part on user input associated with the first zone identifier, a change to the second permission such that the second permission enables controlling the second content output; and
causing, based at least in part on the change, a first presentation via the second speaker or the second display of an indication that controlling the second content output is permitted and a second presentation of the second content control component via the second display, the first presentation being different from the second presentation.

5. The computer-implemented method of claim 4, further comprising:
determining that an operation to control the first content output is to be performed based at least in part on a selection of the first content control component via the first graphical user interface;
causing the first speaker to perform the operation on the first content output;
causing, in the first graphical user interface, a third presentation of an indication that the operation is performed;
causing the second speaker to perform the operation on the second content output; and
causing, in the second graphical user interface, a fourth presentation of the indication.

6. The computer-implemented method of claim 4, further comprising:
causing, in the first graphical user interface, a first presentation of a content library;
causing, in the second graphical user interface, a second presentation of the content library;

determining that the second permission enables requesting content from the content library; and causing, in the second graphical user interface, a presentation of a content request component.

7. The computer-implemented method of claim 6, further comprising:

determining that third content output from the content library is requested based at least in part on a selection of the content request component;

causing, in the first graphical user interface, a request for the third content output to be presented;

determining that input data via the first graphical user interface indicates a permission for the third content output; and causing the third content output by the second speaker.

8. The computer-implemented method of claim 4, further comprising:

receiving audio data corresponding to a natural language utterance associated with the second zone identifier and requesting a change to the second content output;

determining that the change is prohibited based at least in part on the second permission; and causing, in the second graphical user interface, a presentation of a first indication that the change is prohibited.

9. The computer-implemented method of claim 8, further comprising:

causing, in the first graphical user interface, a presentation of a second indication that the change was requested and a presentation of a third control component that requests the change to be permitted.

10. The computer-implemented method of claim 4, further comprising:

causing, in the first graphical user interface, a presentation of a third control component that enables to change an association of the second zone identifier with a first operational mode to a second operational mode, wherein the second zone identifier is associated with the second permission in the first operational mode and is associated with the first permission in the second operational mode.

11. The computer-implemented method of claim 4, further comprising:

causing, in the first graphical user interface, a presentation of a third content control component that enables associating the first permission with the second zone identifier;

associating the second zone identifier with the first permission; and causing, in the second graphical user interface, a presentation of the third content control component.

12. The computer-implemented method of claim 4, further comprising:

determining that the first zone identifier is associated with a first profile of a first user;

determining that the first profile indicates the first permission;

associating the first zone identifier with the first permission;

determining that the second zone identifier is associated with a second profile of a second user;

determining that the second profile lacks the first permission; and associating the second zone identifier with the second permission.

13. A system comprising:

one or more processors; and one or more memory storing instructions that, upon execution by the one or more processors, configure the system to:

determine that a first zone identifier is associated with at least a first permission that enables identifying first content output and enables controlling the first content output;

determine that a second zone identifier is associated with at least a second permission that enables identifying second content output and prohibits controlling the second content output;

cause the first content output by a first speaker associated with the first zone identifier;

cause, based at least in part on the first permission, a first display to present a first graphical user interface that identifies the first content output and includes a first content control component, the first display associated with the first zone identifier;

cause the second content output by a second speaker associated with the second zone identifier;

cause, based at least in part on the second permission, a second display to present a second graphical user interface that identifies the second content output and excludes a second content control component associated with controlling the second content output via the second display, the second display associated with the second zone identifier;

cause, based at least in part on user input associated with the first zone identifier, a change to the second permission such that the second permission enables controlling the second content output; and cause, based at least in part on the change, a first presentation via the second speaker or the second display of an indication that controlling the second content output is permitted and a second presentation of the second content control component via the second display, the first presentation being different from the second presentation.

14. The system of claim 13, wherein the one or more memory store additional instructions that, upon execution by the one or more processors, configure the system to:

cause, in the first graphical user interface, a presentation of a third control component that enables to change an association of the second zone identifier from a first operational mode to a second operational mode, wherein the second zone identifier is associated with the second permission in the first operational mode;

determine a selection of the third control component;

associate the second zone identifier with the first permission; and cause, in the second graphical user interface, a presentation of the second content control component.

15. The system of claim 13, wherein the one or more memory store additional instructions that, upon execution by the one or more processors, configure the system to:

store data indicating that the first permission enables controlling a vehicular system;

receive first input data associated with the first zone identifier and indicating a first request to control the vehicular system;

determine that the first request is permitted based at least in part on the first permission;

cause a control of the vehicular system; and cause at least one of the first speaker or the first display to indicate the control.

16. The system of claim 15, wherein the one or more memory store further instructions that, upon execution by the one or more processors, configure the system to:
- receive second input data associated with the second zone identifier and indicating a second request to control the vehicular system;
- determine that the second request is denied based at least in part on the second permission; and
- cause at least one of the second speaker or the second display to indicate that the second request is denied.

17. The system of claim 13, wherein the one or more memory store additional instructions that, upon execution by the one or more processors, configure the system to:
- cause, based at least in part on a first operational mode, a presentation of a same video content on the first display, the second display, and a third display; and
- cause, based at least in part on an association of the second zone identifier with a second operational mode, a presentation of a different video content on the second display.

18. The system of claim 13, wherein the one or more memory store additional instructions that, upon execution by the one or more processors, configure the system to:
- determine that, in a first operational mode, the second zone identifier is associated with a first permitted operation;
- enable, when the second speaker and the second display are operated in the first operational mode, the first permitted operation in association with the second zone identifier;
- determine that, in a second operational mode, the second zone identifier is associated with a second permitted operation;
- enable, when the second speaker and the second display are operated in the second operational mode, the second permitted operation in association with the second zone identifier; and
- disable, when the second speaker and the second display are operated in the second operational mode, the first permitted operation in association with the second zone identifier.

19. The system of claim 18, wherein the one or more memory store further instructions that, upon execution by the one or more processors, configure the system to:
- determine that, in the first operational mode, the first zone identifier is associated with the first permitted operation and the second permitted operation;
- determine, that, in the second operational mode, the first zone identifier is associated with the first permitted operation and the second permitted operation; and
- enable, when the first speaker and the first display are operated in the first operational mode or the second operational mode, the first permitted operation and the second permitted operation in association with the first zone identifier.

20. The system of claim 13, wherein the one or more memory store additional instructions that, upon execution by the one or more processors, configure the system to:
- determine that the first zone identifier is associated with a profile of a user; and
- cause a customization of a content presentation in the first graphical user interface based at least in part on the profile.

* * * * *